(12) United States Patent
Khandelwal et al.

(10) Patent No.: US 12,412,251 B2
(45) Date of Patent: Sep. 9, 2025

(54) METHODS AND SYSTEMS FOR DENOISING MEDIA FRAMES CAPTURED IN LOW-LIGHT ENVIRONMENT

(71) Applicant: SAMSUNG ELECTRONICS CO., LTD., Suwon-si (KR)

(72) Inventors: Gaurav Khandelwal, Bengaluru (IN); Sai Snehith Garlapati, Bengaluru (IN); Vivek Maik D, Bengaluru (IN); Balaji Shashipreeth Racherla, Bengaluru (IN); Sweta Singh, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 348 days.

(21) Appl. No.: 18/131,752

(22) Filed: Apr. 6, 2023

(65) Prior Publication Data

US 2023/0245279 A1 Aug. 3, 2023

Related U.S. Application Data

(63) Continuation of application No. PCT/KR2021/013964, filed on Oct. 7, 2021.

(30) Foreign Application Priority Data

Oct. 7, 2020 (IN) .............................. 202041043698
Sep. 15, 2021 (IN) .............................. 202041043698

(51) Int. Cl.
*G06T 5/70* (2024.01)
*G06T 3/403* (2024.01)
(Continued)

(52) U.S. Cl.
CPC ................ *G06T 5/70* (2024.01); *G06T 3/403* (2013.01); *G06T 5/10* (2013.01); *G06T 5/73* (2024.01);
(Continued)

(58) Field of Classification Search
CPC .. G06T 5/70; G06T 3/403; G06T 5/10; G06T 5/73; G06T 7/11; G06T 2207/20056
See application file for complete search history.

(56) References Cited

U.S. PATENT DOCUMENTS 8,149,336 B2 4/2012 Mohanty et al.
8,471,928 B2 6/2013 Yoo et al.
(Continued)

FOREIGN PATENT DOCUMENTS

KR 10-1589717 B1 1/2016

OTHER PUBLICATIONS

Shashipreeth, Racherla "Low Light Image Enhancement using DCE-NET aided by Pack and Unpack operations", 2011, pp. 1124-1127. (Year: 2011).*

(Continued)

*Primary Examiner* — Matthew C Bella
(74) *Attorney, Agent, or Firm* — Sughrue Mion, PLLC

(57) ABSTRACT

Methods and systems for denoising media frames captured in low-light environment are provided. A method includes obtaining a media frame in pixel space using adaptive trimming of Fourier coefficients of an input media frame based on a threshold criterion, and obtaining a media frame in curvelet space by performing curvelet transform on the media frame in pixel space, extracting a texture frame based on texture details and a homogeneous frame based on homogeneous details, present in the media frame in pixel space, performing longitudinal and latitudinal filtering of the texture and homogeneous frames downscaled by a same factor, integrating the longitudinal and latitudinal filtered texture and homogeneous frames, upscaling the integration to obtain a curvelet media frame, and obtaining an output media frame by sharpening the curvelet media frame in multiple iterations based on partially sharpened curvelet (Continued)

media frames, the curvelet media frame, and the media frame in curvelet space.

15 Claims, 24 Drawing Sheets

(51) Int. Cl.
*G06T 5/10* (2006.01)
*G06T 5/73* (2024.01)
*G06T 7/11* (2017.01)

(52) U.S. Cl.
CPC ...... *G06T 7/11* (2017.01); *G06T 2207/20056* (2013.01)

(56) References Cited

U.S. PATENT DOCUMENTS

| | | |
|---|---|---|
| 2007/0110290 A1 | 5/2007 | Chang et al. |
| 2009/0278961 A1 | 11/2009 | Mohanty et al. |
| 2018/0259662 A1 | 9/2018 | Srinivasan |
| 2020/0058102 A1 | 2/2020 | Lu et al. |

OTHER PUBLICATIONS

Anandan P, "Medical Image Denoising using Fast Discrete Curvelet Transform", Jul. 2020, pp. 3760-3765. (Year: 2020).*

Starck, Jean-Luc, "The Curvelet Transform for Image Denoising", Jun. 6, 2002, IEEE, pp. 670-684.(Year: 2002).*

Kannoth, Sreekala, "Low light image enhancement using curvelet transform and iterative back projections", 2023, pp. 1-10. (Year: 2023).*

Rahman, Ziaur et al., "Structure revealing of low-light images using wavelet transform based on fractional-order denoising and multiscale decomposition", The Visual Computer, Apr. 3, 2020. (16 pages total).

Sun, Tingting et al., "Readability Enhancement of Low Light Videos Based on Discrete Wavelet Transform", 2017 IEEE International Symposium on Multimedia (ISM), Dec. 11-13, 2017, pp. 342-345. (5 pages total).

International Search Report (PCT/ISA/210) issued Jan. 24, 2022 by the International Searching Authority in counterpart International Patent Application No. PCT/KR2021/013964.

Written Opinion (PCT/ISA/237) issued Jan. 24, 2022 by the International Searching Authority in counterpart International Patent Application No. PCT/KR2021/013964.

Communication issued May 26, 2022 by the Intellectual Property Office of India in counterpart Indian Patent Application No. 202041043698.

* cited by examiner

FIG. 3

| P1  | P2  | P3  | P4  |
|-----|-----|-----|-----|
| P5  | P6  | P7  | P8  |
| P9  | P10 | P11 | P12 |
| P13 | P14 | P15 | P16 |

| TH_FB1 | TH_FB2 | TH_FB3 | TH_FB4 |
|---|---|---|---|
| TH_FB5 | TH_FB6 | TH_FB7 | TH_FB8 |
| TH_FB9 | TH_FB10 | TH_FB11 | TH_FB12 |
| TH_FB13 | TH_FB14 | TH_FB15 | TH_FB16 |

FIG. 6

| (1,1) | (1,2) | (1,3) | (1,4) | | | | |
|---|---|---|---|---|---|---|---|
| (2,1) | (2,2) | (2,3) | (2,4) | | | | |
| (3,1) | (3,2) | (3,3) | (3,4) | | | | |
| (4,1) | (4,2) | (4,3) | (4,4) | | | | |
| | | | | | | | |
| | | | | | | | |
| | | | | | | | |
| | | | | | | | |

Iteration 1

Iteration 2

Iteration N

METHODS AND SYSTEMS FOR DENOISING MEDIA FRAMES CAPTURED IN LOW-LIGHT ENVIRONMENT

CROSS-REFERENCE TO RELATED APPLICATIONS

This application is a bypass continuation application of International Patent Application PCT/KR2021/013964, filed on Oct. 7, 2021, which is based on and claims priority to Indian Provisional Patent Application No. 202041043698, filed on Oct. 7, 2020, and Indian Complete Patent Application No. 202041043698, filed on Sep. 15, 2021, in the Indian Patent Office, the disclosures of which are incorporated by reference herein in their entireties.

BACKGROUND

1. Field

The disclosure relates to image/video processing, and more particularly to methods and systems for denoising media frames captured in a low-light environment.

2. Description of Related Art

Media capturing involves detecting light using sensors of a camera, wherein different sensors are configured to capture light of different wavelengths. The light is captured in the form of photons, which are converted to electrical voltage. The electrical voltages captured by the different sensors of the camera are analog values, which can be converted to a digital values using Analog to Digital Converters (ADCs) employed by the camera. These digital values can be referred to as pixel information. The light entering the camera (captured by the sensors of the camera) may depend on the external lighting conditions such as bright light conditions, low light conditions, dusk time, dawn time, and so on. This is because the lighting conditions (as referred) are distinct.

The cost of the sensors employed in the camera can be directly proportional to the ability of the sensors to capture light and transform the captured light to corresponding pixel information. The sensitivity of the sensors of the camera to capture light in different conditions can be a critical factor in defining the media quality. If the sensitivity of the sensors of the camera is modest or in mid-range, the sensors may perform well in conditions such as broad daylight or good lighting conditions. However, if media is captured in low light conditions, the sensors may lead to the generation of a degraded or noisy media. Such noisy media may require post-processing for denoising the media and boosting the quality of the media.

The existing methods and systems used for the post-processing consider the noise in the media, introduced during the capturing of the media in low light conditions, as similar to, or same as, any other type of noise that may be present in the media. The post-processing may not be effective as the post-processing may involve detecting the low light noise directly on the pixels of the media frames. Detecting the low light noise directly on the pixels is ineffective since the electrical voltages representing the pixels of the media frames are close to zero (in low light conditions). The existing methods and systems using adaptive mechanisms mainly rely on determining differences between the pixels for computing derivative or gradient for noise detection. The computation of the gradient for low light noise detection may also be ineffective (for media captured in low light conditions), as variance in the differences are negligible.

SUMMARY

Provided are methods and systems for denoising media frames captured in low-light environment using a filter bank approach with edge preservation media denoising, wherein denoising involves utilizing features, customized for denoising media captured in low light conditions, viz., Fourier coefficient trimming and edge preservation for yielding media having a high visual quality.

In addition, provided are methods and systems for denoising of low light media frames using a combination of non-local selection of features present in the low light media frames, sub-band detail improvement in curvelet domain, and an iterative procedure for multiplicative noise removal.

According to an aspect of the disclosure, a method for denoising at least one media frame captured in a low-light environment, includes: obtaining a Fourier trimmed media frame in pixel space by an adaptive trimming of Fourier coefficients of an input media frame based on a Fourier block threshold criterion, wherein the Fourier coefficients are obtained by performing a Fourier transform of the input media frame; obtaining a Fourier trimmed media frame in curvelet space by performing a curvelet transform on the Fourier trimmed media frame in pixel space; extracting a texture frame based on texture details present in the Fourier trimmed media frame in pixel space, and a homogeneous frame based on homogeneous details present in the Fourier trimmed media frame in pixel space, by performing a curvelet transform of the Fourier trimmed media frame in pixel space; obtaining a longitudinal filtered texture frame by performing at least one longitudinal filtering of the texture frame, wherein the texture frame is downscaled by a predefined factor prior to the at least one longitudinal filtering; obtaining a latitudinal filtered homogeneous frame by performing at least one latitudinal filtering of the homogeneous frame, wherein the homogeneous frame is downscaled by the predefined factor prior to the at least one latitudinal filtering; extracting a curvelet denoised media frame in curvelet space by integrating the longitudinal filtered texture frame and the latitudinal filtered homogeneous frame to form an integrated frame, and upscaling the frame; and obtaining an output denoised media frame by sharpening the curvelet denoised media frame in curvelet space in a plurality of iterations, wherein at each iteration a partially sharpened curvelet denoised media frame in curvelet space is obtained, wherein the sharpening at each iteration is performed based on a partially sharpened curvelet denoised media frame in curvelet space obtained at a previous iteration, the curvelet denoised media frame in curvelet space, and the Fourier trimmed media frame in curvelet space.

The Fourier coefficients of the input media frame may be grouped into a plurality of blocks based on spatial arrangement of pixels, represented by the Fourier coefficients, in the input media frame, and the Fourier block threshold criterion may include a plurality of a Fourier block threshold respectively determined for each of the plurality of blocks based on a bilateral patch variance of each of the plurality of blocks and a maximum Fourier coefficient value of each of the plurality of blocks.

The bilateral patch variance of each of the plurality of blocks may be determined based on a Fourier transform of a standard deviation of each of the plurality of blocks of the input media frame.

Fourier coefficients in each of the plurality of blocks may be adaptively trimmed by converting the Fourier coefficients in each of the plurality of blocks to zero, if the Fourier coefficients in each of the plurality of blocks are determined to be less than the Fourier block threshold corresponding to each of the plurality of blocks.

The performing longitudinal filtering of the texture frame may include: determining a product of the texture frame downscaled by the predefined factor and a frame including bilateral longitudinal coefficients, wherein the bilateral longitudinal coefficients are dissimilar along columns of the frame; determining curvelet variances and curvelet medians of elements in each column of the product; and performing the longitudinal filtering of each element in each of the columns of the product based on the curvelet variances of the elements in each of the columns of the product and the curvelet medians of the elements in each of the columns of the product.

The performing latitudinal filtering of the homogeneous frame may include: determining a product of the homogeneous frame downscaled by the predefined factor and a frame including bilateral latitudinal coefficients, wherein the bilateral latitudinal coefficients are dissimilar along rows of the frame; determining curvelet variances and curvelet medians of elements in each row of the product; and performing the longitudinal filtering of each element in each of the rows of the product based on the curvelet variances of the elements in each of the rows of the product and the curvelet medians of the elements in each of the rows of the product.

A partially sharpened curvelet denoised media frame in curvelet space at a current iteration may be obtained by convoluting a uniform blur kernel with the curvelet denoised media frame in curvelet space.

A partially sharpened curvelet denoised media frame in curvelet space at a current step may be obtained by integrating the Fourier trimmed media frame in curvelet space with a result of subtraction of the curvelet denoised media frame in curvelet space from the partially sharpened curvelet denoised media frame in curvelet space obtained at a previous iteration.

According to an aspect of the disclosure, a method for denoising at least one input media frame captured in a low-light environment, includes: filtering frequencies representing noise in an input media frame to obtain a first media frame, wherein the filtering involves trimming Fourier coefficients, obtained by performing a Fourier transform of the input media frame, based on local similarities and global information present in the input media frame; extracting a texture frame based on texture details present in the first media frame, and a homogeneous frame based on homogeneous details present in the first media frame, wherein the texture frame and the homogeneous frame are extracted by performing a curvelet transform of the first media frame; obtaining a second media frame by integrating an enhanced texture frame and an enhanced homogeneous frame, wherein the enhanced texture frame is obtained by at least one longitudinal filtering of the texture frame and the enhanced homogeneous frame is obtained by at least one latitudinal filtering of the homogeneous frame; and obtaining an output media frame by sharpening the second media frame in a plurality of iterations, wherein the sharpening at each iteration is performed based on at least one of a smooth kernel, the second media frame, a partially sharpened second media frame obtained at a previous iteration, and the first media frame.

The local similarities may be determined by segmenting the input media frame into a plurality of blocks, and computing a bilateral patch variance for each of the plurality of blocks based on standard deviation of pixels in each of the plurality of blocks, and the global information may be determined by performing the Fourier transform of the input media frame.

The texture frame may be downscaled prior to the at least one longitudinal filtering, the enhanced texture frame may be upscaled prior to integrating with the enhanced homogeneous frame, the homogeneous frame may be downscaled prior to the at least one latitudinal filtering, and the enhanced homogeneous frame may be upscaled prior to integrating with the enhanced texture frame.

The sharpening at a first iteration may be performed by convoluting the smooth kernel with the second media frame, and the sharpening at each of the plurality of iterations, apart from the first iteration, may be performed by integrating the first media frame with a result of subtraction of the second media frame from the partially sharpened second media frame obtained at the previous iteration.

According to an aspect of the disclosure, a method for denoising a media frame, includes: obtaining a first media frame by filtering Fourier coefficients of the media frame based on at least one of local features information and global features information, extracted from the media frame in a frequency domain; obtaining a second media frame by performing longitudinal filtering of texture details extracted from the first media frame in a curvelet domain; obtaining a third media frame by performing latitudinal filtering of homogeneous details extracted from the first media frame in the curvelet domain; obtaining a fourth media frame by integrating the second media frame and the third media frame; and obtaining a denoised media frame by incrementally sharpening the fourth media frame based on a smooth kernel, a partially sharpened fourth media frame, the fourth media frame and the first media frame in the curvelet domain.

The texture details extracted from the first media frame may be downscaled prior to longitudinal filtering, and the second media frame may be upscaled prior to integrating with the third media frame.

The homogeneous details extracted from the first media frame may be downscaled prior to latitudinal filtering, and the third media frame may be upscaled prior to integrating with the second media frame.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 shows an example media frame split into sixteen blocks, wherein bilateral patch variances corresponding to each of the sixteen blocks is computed for consideration of local similarities, according to embodiments;

FIG. 4 shows an example media frame in Fourier space, wherein Fourier coefficients of the media frame in Fourier space is split into sixteen blocks for consideration of global information, according to embodiments;

FIG. 5 shows Fourier block thresholds of an example media frame in Fourier space, wherein the Fourier block thresholds are computed for each block of the media frame in Fourier space, according to embodiments;

FIG. 6 shows an example block of the media frame in Fourier space, wherein Fourier coefficients of the block can be adaptively trimmed based on the Fourier block threshold of the block, according to embodiments;

DETAILED DESCRIPTION

Figure 1:
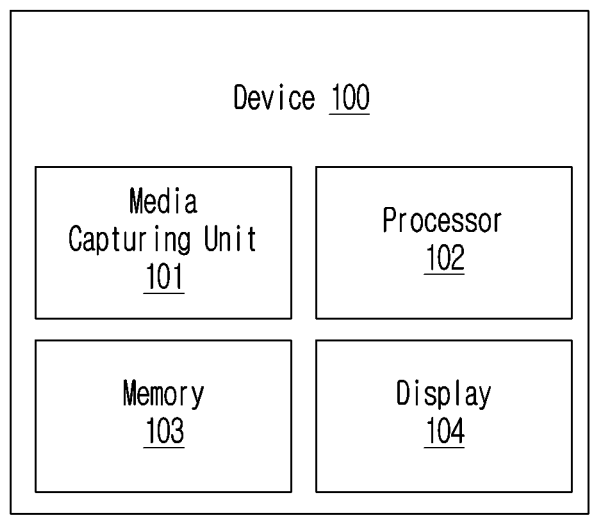
FIG. 1 is a block diagram of various functional and structural units of a device configured to denoise media frames captured in low-light environment, according to embodiments.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments herein disclose methods and systems for denoising media frames captured in low-light environment using a filter bank approach with edge preservation media denoising. Referring now to the drawings, and more particularly to FIGS. 1 through 20b, where similar reference characters denote corresponding features consistently throughout the figures, there are shown preferred embodiments.

FIG. 1 is a block diagram showing various functional and structural units of a device 100 configured to denoise media frames captured in low-light environment, according to embodiments. As shown in FIG. 1, the device 100 comprises a media capturing unit 101, at least one processor 102, at least one memory 103, and a display 104. The media frames refer to an image frame or a video frame. In an embodiment, the device 100 can process media frames captured by an image capturing device for denoising the media frames. In another embodiment, the device 100 can be an image capturing device and directly process the captured media frames for denoising the media frames.

Examples of the device 100 include, but not limited to, a camera, a smart phone, a laptop, an Internet of Things (IoT) device, a wearable device, and so on.

The media capturing unit 101 comprises sensors, electronic circuits, Analogue to Digital Circuits (ADCs), Red Green Blue (RGB) interpolators, and so on. The sensors are sensitive to light of specific wavelength. The electronic circuits are capable of processing captured light and converting the light into analogue electric voltages. The ADCs convert the analogue electric voltages to digital values, which represent pixel information of media frames. The RGB interpolators interpolate the pixel information of a media frame for generating clusters of information that can be processed separately by a red channel, a green channel, and a blue channel.

In an embodiment, the processor 102 can perform all operations and computations required for denoising media frames captured in low light environment. In another embodiment, the processor 102 can include a plurality of processing units, wherein each processing unit is configured to perform a specific function. The overall effect of the functions performed by the plurality of processing units can result in the denoising of media frames.

The processor 102 can split a media frame (image or video frame) into a plurality of blocks, wherein the number of pixels in each block is same. The processor 102 can compute variance of each of the plurality of blocks based on pixel information of the pixels in each block. The processor 102 can perform a Fourier transform of the pixel information of each pixel of the media frame to obtain Fourier coefficients corresponding to each pixel. The processor 102 can determine a Fourier block threshold corresponding to each block based on the variance of the block and the highest value of Fourier coefficient of the block. The processor 102 can utilize the Fourier block threshold of each block to filter Fourier coefficients of each block whose values are less than the corresponding Fourier block threshold of the block.

The processor 102 can convert the media frame in Fourier space (media frame in which the pixels of the media frame are represented by corresponding Fourier coefficients) to a media frame in pixel space (media frame comprising of pixels representing pixel information). The processor 102 can convert the media frame in pixel space to a media frame in curvelet space (a media frame in which pixels of the media frame are represented by corresponding curvelet coefficients). The processor 102 can downscale the media frame in curvelet space by predefined factors. The processor 102 can obtain curvature details and homogeneous details present in the downscaled versions of the media frame in curvelet space. The processor 102 can compute bilateral longitudinal coefficients and bilateral latitudinal coefficients using bilateral longitudinal filter kernel and bilateral latitudinal filter kernel. The processor 102 can perform longitudinal filtering on the curvature details using the bilateral longitudinal coefficients. The processor 102 can perform latitudinal filtering on the homogeneous details using the bilateral latitudinal coefficients.

The processor 102 can sharpen the media frame in curvelet space, which has been subjected to longitudinal filtering and latitudinal filtering, using an iterative procedure, wherein sharpness of the media frame increases progressively in successive iterations. In the first iteration, the processor 102 can convolute the media frame in curvelet space (which has been subjected to longitudinal filtering and latitudinal filtering) with a smooth kernel to obtain a first sharpened media frame in curvelet space.

In the second iteration, the processor 102 can subtract the media frame in curvelet space (which has been subjected to longitudinal filtering and latitudinal filtering) from the first sharpened media frame in curvelet space, and add the result of the subtraction to a curvelet derivative prior. The result of the addition is a first sharpened media frame in curvelet space. The successive iterations are similar to the second iteration, apart from the variable "sharpened media frame in curvelet space" (which has been obtained from the previous iteration). The final sharpened media frame in curvelet space (obtained from the final iteration) is the output media frame in curvelet space. The processor 102 can convert the output media frame in curvelet space to pixel space.

The memory 103 can store media frames generated during intermediate operations, such as media frames in Fourier space (after performing Fourier transform on pixel information), media frames in pixel space after Fourier coefficient trimming, media frames in curvelet space (after performing a curvelet transform on pixel information representing the pixels of the media frame in pixel space subjected to Fourier coefficient trimming in Fourier space), bilateral longitudinal coefficients, bilateral latitudinal coefficients, and so on. The display 104 can display an output denoised media frame, i.e., the output media frame in pixel space.

FIG. 1 shows exemplary units of the device 100, but it is to be understood that other embodiments are not limited thereon. In other embodiments, the device 100 may include less or more number of units. Further, the labels or names of the units of the device 100 are used only for illustrative purpose and does not limit the scope of the disclosure. One or more units can be combined together to perform same or substantially similar function in the device 100.

Figure 2A:
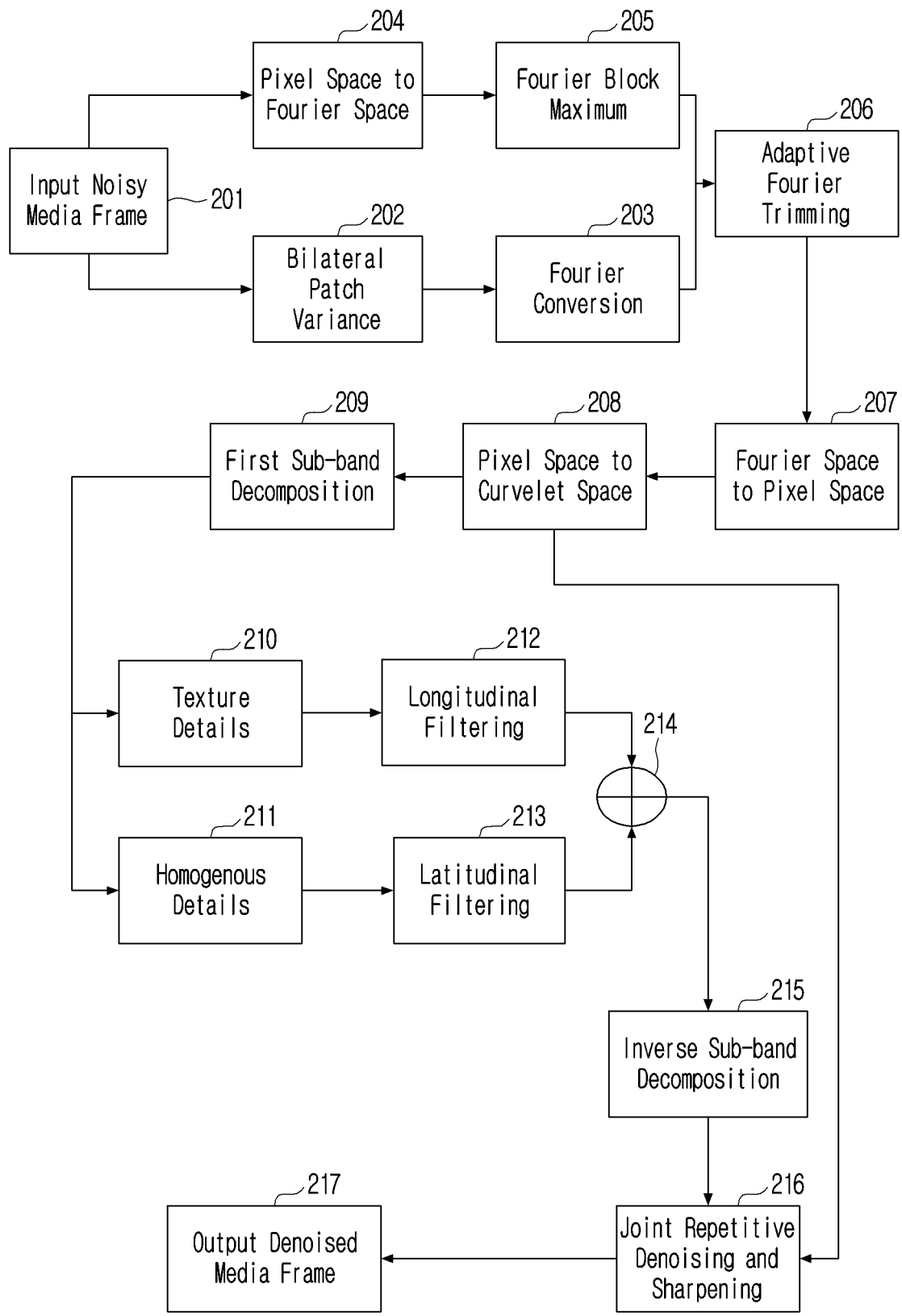
FIGS. 2A and 2B are flow diagrams of methods performed on an input noisy media frame for generating an output denoised media frame, according to embodiments.
Figure 2B:
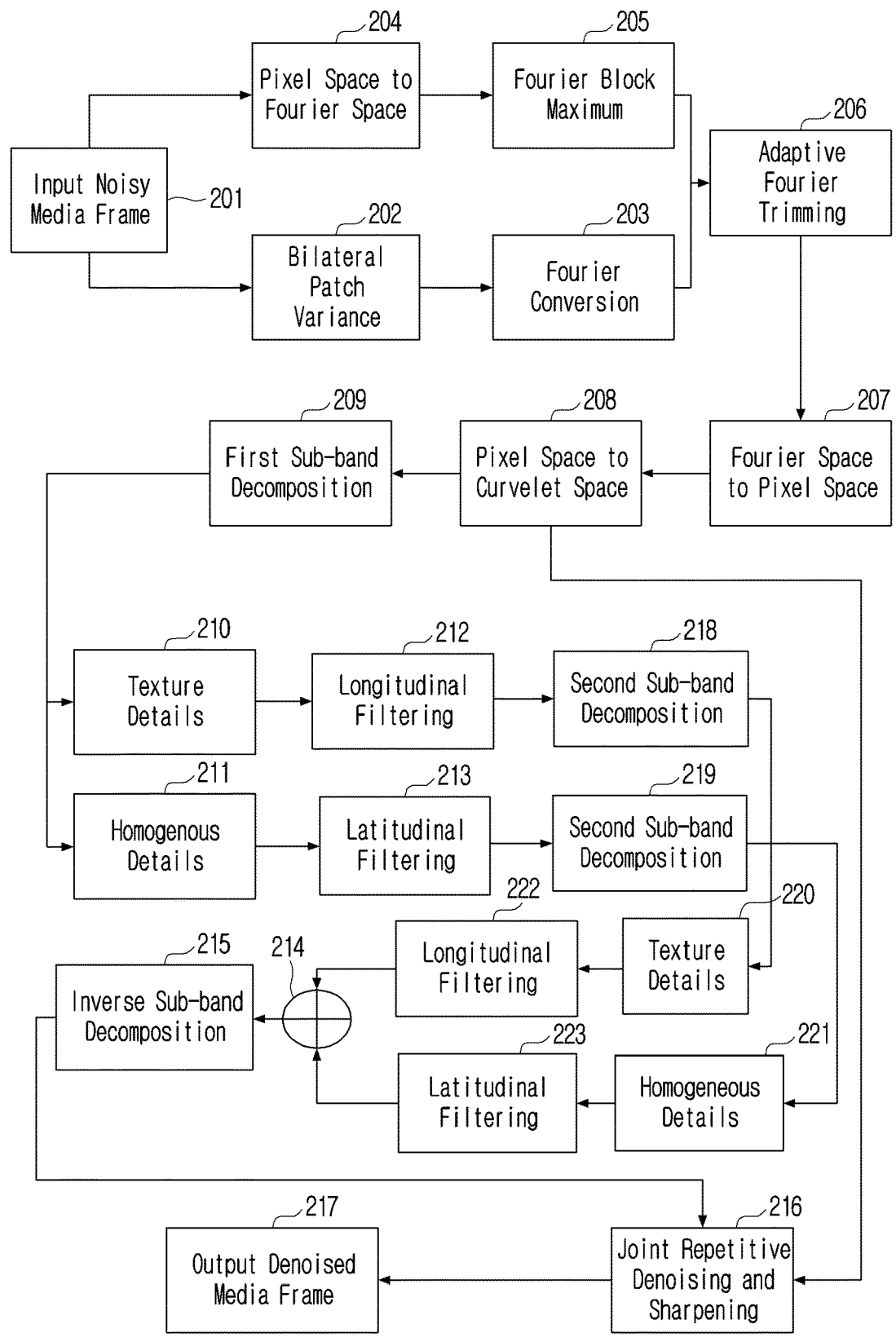

FIGS. 2A and 2B are flow diagrams depicting methods performed on an input noisy media frame for generating an output denoised media frame, according to embodiments. The media frame can be an image or a video frame. Consider that the media frame has been captured in an environment with low-lighting. The captured media frame can be referred to as the input noisy media frame (201). The noise in the captured media frame is introduced due to the low-lighting conditions. As the input noisy media frame (201) is comprised of pixels, the input noisy media frame (201) is considered to be in pixel space. The embodiments include splitting the input noisy media frame (201) (in pixel space) into a plurality of blocks for application of block based filtering on the input noisy media frame (201). For example, consider that the input noisy media frame (201) is split into sixteen blocks, wherein number of pixels in each block is same. The block based filtering ensures that equal importance is provided to local similarities and global information in the input noisy media frame (201). This, in turn, leads to non-local selection of each of the plurality of blocks in the input noisy media frame (201).

For each the plurality of blocks in the input noisy media frame (201), the embodiments include computing a bilateral patch variance ($p_i$), wherein 'i' represents a block index (202). As the input noisy media frame (201) is split into sixteen blocks, the embodiments include computing sixteen bilateral patch variances. FIG. 3 shows an example media frame split into sixteen blocks, wherein bilateral patch variances corresponding to each of the sixteen blocks is computed for consideration of local similarities, according to embodiments. The embodiments compute sixteen bilateral patch variances $p_1$-$p_{16}$ (202) corresponding to each block. In an embodiment, the bilateral patch variance of a block ($p_i$) is computed based on standard deviation of the block ($\sigma_i$), wherein $p_i = 2\sigma_i$. The standard deviation of a block can be computed based on number of pixels present in the block, values of the pixels (representing pixel information) in the block, and a mean of the values of the pixels in the block. Thus, the computed bilateral patch variances of the blocks. i.e., $p_1$-$p_{16}$, will be in pixel domain. The embodiments include converting the bilateral patch variances in pixel domain to Fourier domain (203). As shown in FIG. 3, the bilateral patch variances in Fourier domain (203), corresponding to the bilateral patch variances in pixel domain ($p_1$-$p_{16}$) (202), can be represented as $P_1$-$P_{16}$.

Figure 4:
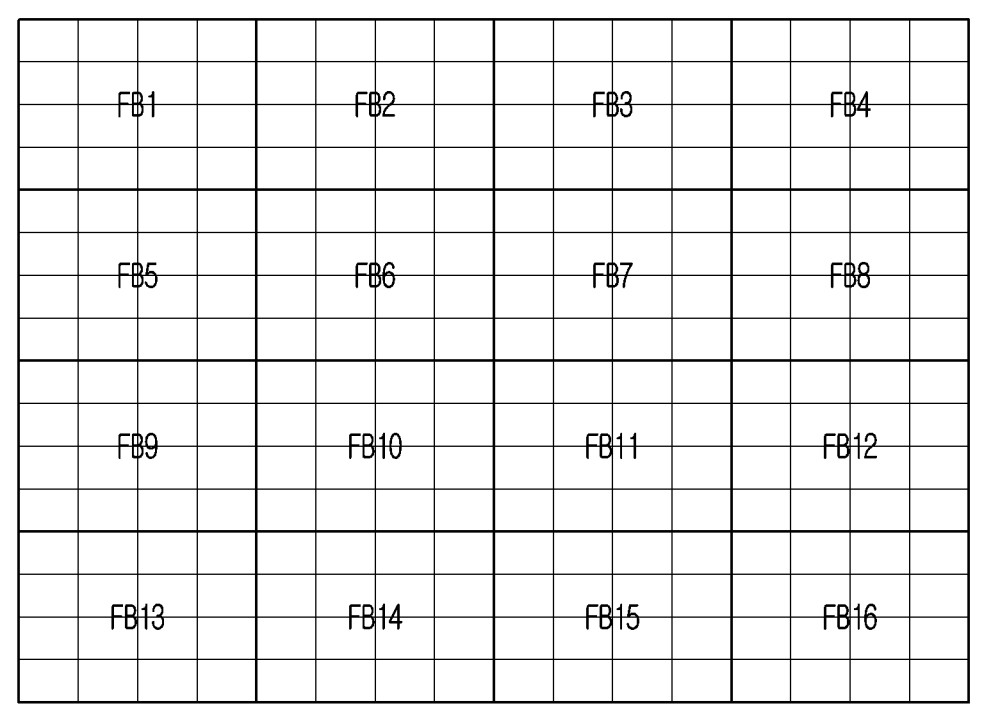

The embodiments include converting the media frame in pixel space (media frame represented by pixel information), i.e., the input noisy media frame (201), into a media frame in Fourier space (204). The pixel information representing the pixels of the input noisy media frame (201) is represented by Fourier coefficients after the conversion. The conversion involves performing a Fourier transform of each pixel of the input noisy media frame (201). The Fourier transforms of the pixels result in obtaining the Fourier coefficients representing the pixels of the input noisy media frame (201). The embodiments include splitting the media frame in Fourier space (204) into a plurality of blocks. FIG. 4 shows an example media frame in Fourier space, wherein Fourier coefficients of the media frame in Fourier space is split into sixteen blocks for consideration of global information, according to embodiments. The Fourier coefficients of the media frame in Fourier space (204) can also be split into sixteen blocks, and can be represented as $FB_i$ (m, n). If the resolution of the input noisy media frame (201) is 16×16

(the media frame in pixel space comprises 256 pixels), and as the input noisy media frame (201) is split into sixteen blocks, m=1-4 and n=1-4, for all i=1-16. The embodiments include determining the pixel with the highest Fourier coefficient value from amongst all the pixels present in the block (205). The highest Fourier coefficient of a block can be referred to as Fourier block maximum or max $FB_i$ (205).

The embodiments include computing a Fourier block threshold ($TH\_FB_i$) for each block. In an embodiment, the Fourier block threshold of a block can be computed based on the bilateral patch variance of the block ($P_i$) and the highest Fourier coefficient value in the block, i.e., Fourier block maximum [max $FB_i$]. In an embodiment, the Fourier block threshold ($TH\_FB_i$) is computed as follows:

$$Th\_FB_i = (exp^{(1/2*P_i)})^{-1} * max(FB_i)$$

FIG. 5 shows Fourier block thresholds of an example media frame in Fourier space (204), wherein the Fourier block thresholds are computed for each block of the media frame in Fourier space (204), according to embodiments. As shown in FIG. 5, the media frame in Fourier space (204) is split into sixteen blocks. Therefore, the embodiments include computing sixteen Fourier block thresholds ($TH\_FB_1$, $TH\_FB_2$, ..., $TH\_FB_{16}$) based on the corresponding bilateral patch variances ($P_1$, $P_2$, ..., $P_{16}$) of the blocks and the corresponding maximum Fourier coefficient values in the blocks (max ($FB_1$), max ($FB_2$), ..., max ($FB_{16}$)).

In an embodiment, for each block, the values of the Fourier coefficients of a block i, i.e., $FB_i$ (m, n), can be converted to zero, if the values of the Fourier coefficients of the block $FB_i$ (m, n) are less than the Fourier block threshold of the block ($TH\_FB_i$). This can be represented as follows:

$$FB_i(m,n)=0 \text{ if } FB_i(m,n) > Th\_P_i$$

Figure 6:
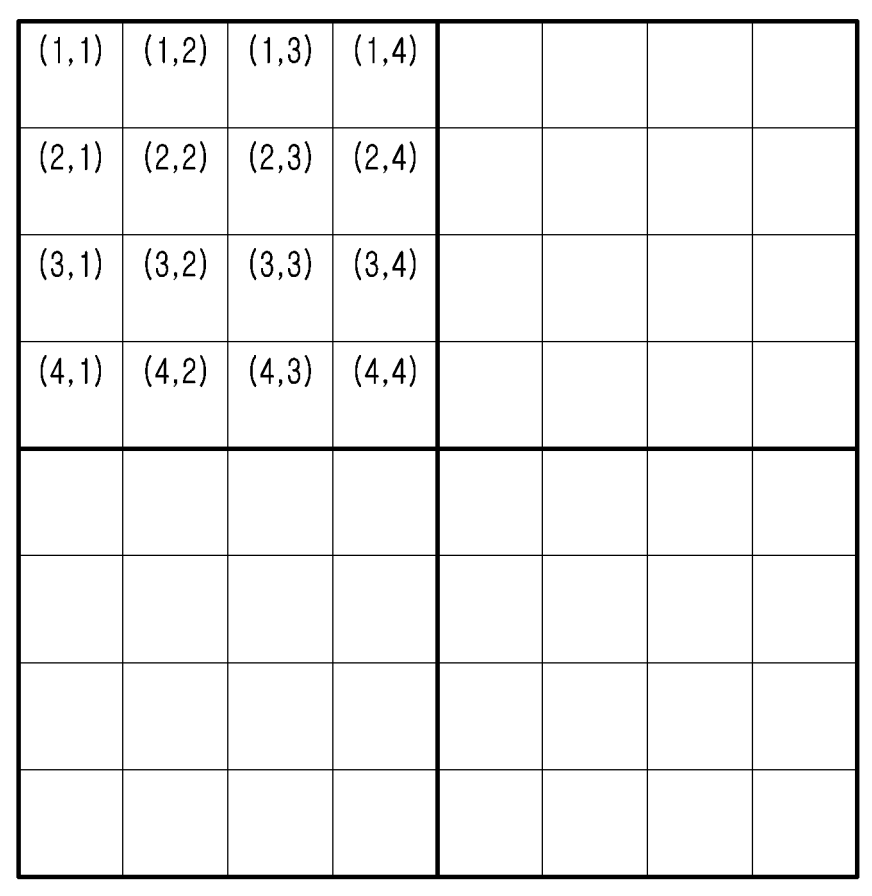

FIG. 6 shows an example block of the media frame in Fourier space (204), wherein Fourier coefficients of the block can be adaptively trimmed based on the Fourier block threshold of the block, according to embodiments. The embodiments include performing an adaptive Fourier trimming (206), wherein the Fourier coefficients of the media frame in Fourier space (204) are adapted based on the Fourier block thresholds of the blocks in which the Fourier coefficients are present. As shown in FIG. 6, the block comprises sixteen Fourier coefficients, wherein m=1-4 and n=1-4. The embodiments include converting the values of selected one or more Fourier coefficients, from amongst the sixteen Fourier coefficients in the block, to zero. The one or more Fourier coefficients can be selected if the values of the one or more Fourier coefficients are less than the Fourier block threshold of the block. The process of converting (adapting) the values of the selected Fourier coefficients to zero can be referred to as trimming.

The adaptive Fourier trimming (206) can be performed for all the blocks of the media frame in Fourier space (204). Thus, the media frame in Fourier space (204) is now represented by blocks of Fourier coefficients, wherein the values of the Fourier coefficients in each of the blocks are greater than the Fourier block thresholds corresponding to the blocks. This media frame can be referred to as Fourier trimmed media frame in Fourier space.

Figure 7:
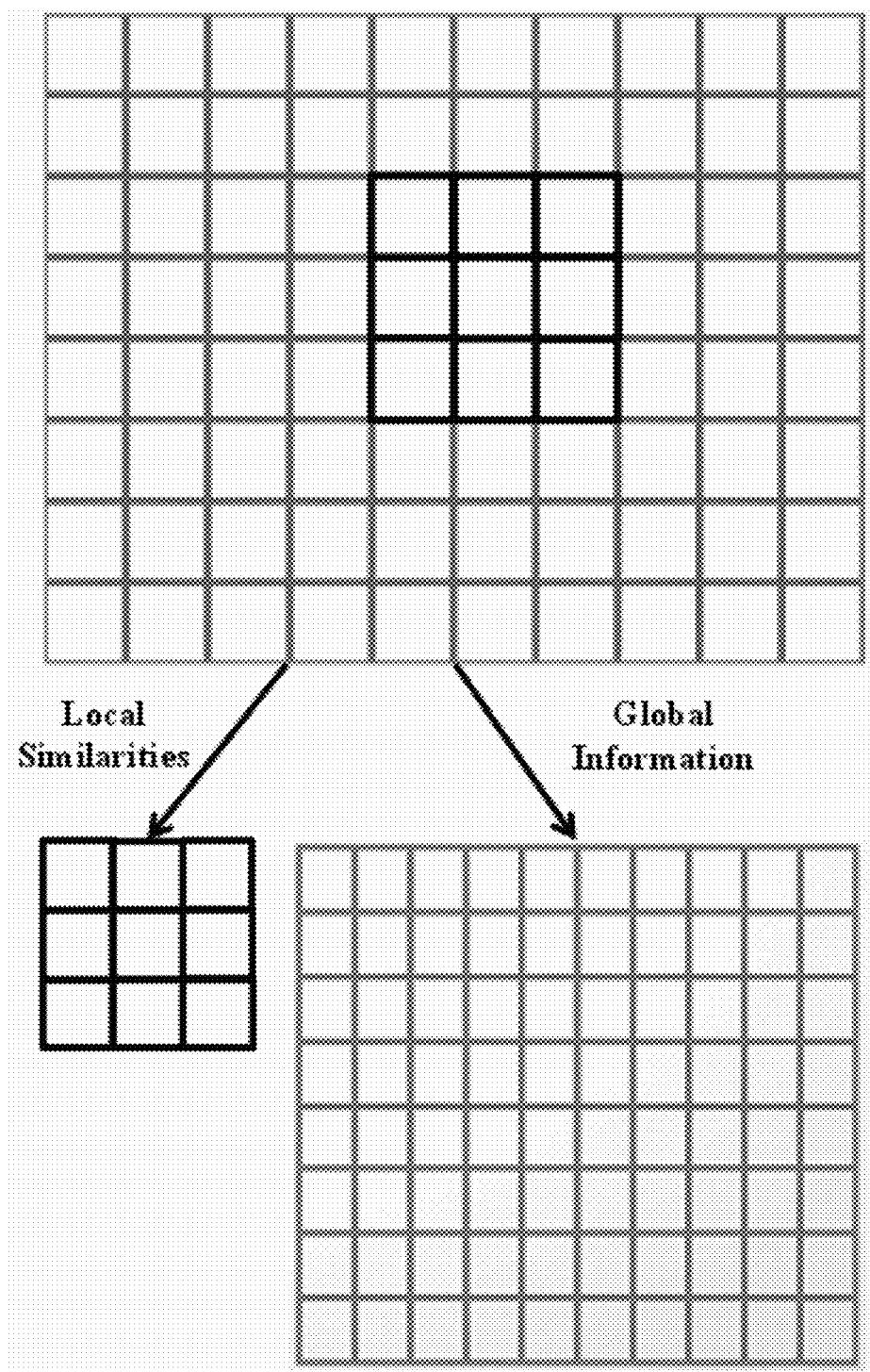
FIG. 7 shows an example input noisy media frame, wherein local similarities and global information present in the input noisy media frame are considered for non-local selection, according to embodiments.

FIG. 7 shows an example input noisy media frame (201), wherein local similarities and global information present in the input noisy media frame (201) are considered for non-local selection, according to embodiments. The local similarities present in the input noisy media frame (201) can be considered by computing the bilateral patch variances of the blocks in Fourier domain (203). The splitting of the input noisy media frame (201) into blocks, computing the bilateral patch variances of each of the blocks, and introducing dependency on block bilateral patch variances ($P_i$) for computation of the $TH\_FB_i$, allows consideration of the local similarities in the input noisy media frame (201). The computation of Fourier coefficients of the input noisy media frame (201)), determination of local (block) maximum Fourier coefficients [max ($FB_i$)], and introduction of dependency on [max ($FB_i$)]] for computation of the $TH\_FB_i$, allows consideration of the global information present in the input noisy media frame (201). The computation of the $TH\_FB_i$, and adapting the Fourier coefficients based on the $P_i$ and the max ($FB_i$) leads to non-local selection of Fourier coefficients.

The non-local selection of Fourier coefficients allows retaining advantageous frequencies and eliminating undesirable frequencies of the input noisy media frame (201). The Fourier coefficients, in the blocks of the media frame in Fourier space (204), with values greater than the Fourier block thresholds corresponding to the blocks, represent the noiseless frequencies of the input noisy media frame (201).

Figure 8:
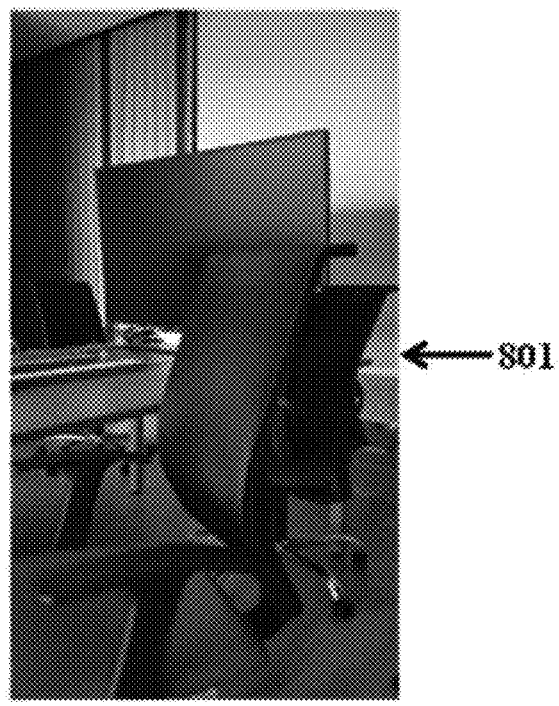
FIG. 8 shows an example of an input noisy media frame, and example frames generated after filtering local similarities and global information, according to embodiments.
Figure 8:
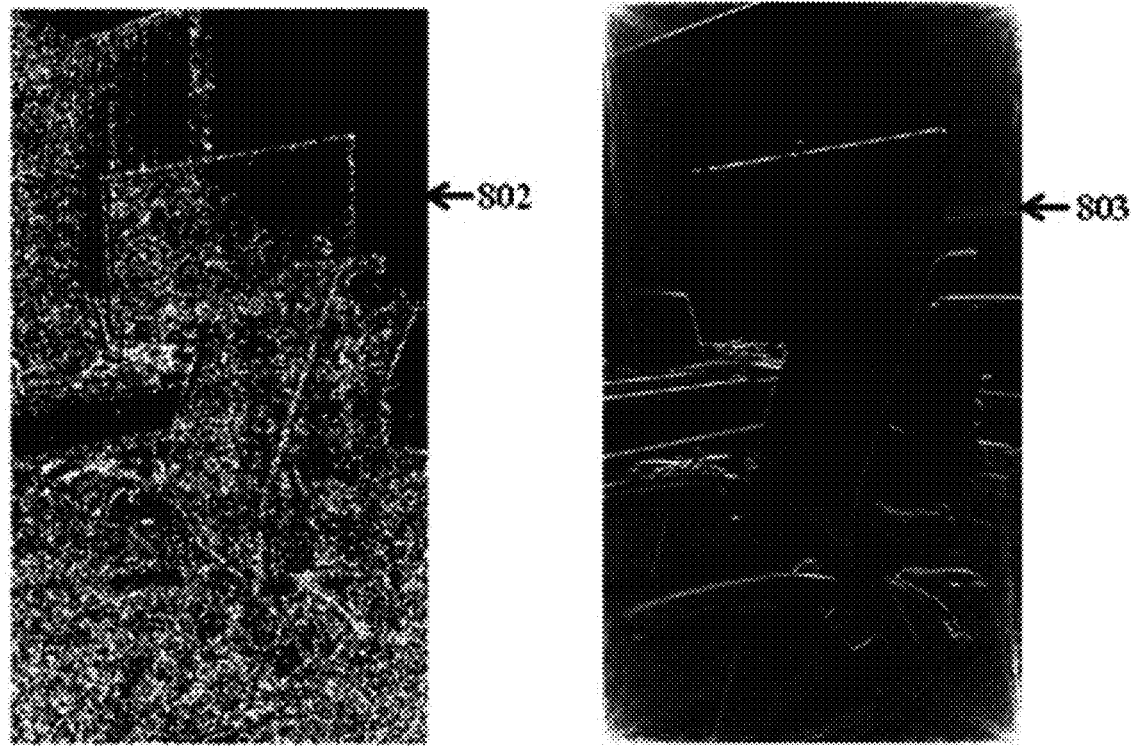

FIG. 8 shows an example of an input noisy media frame, and example frames generated after filtering the local similarities and the global information, according to embodiments. The input noisy media frame (801) can be segmented into a plurality of blocks. The local similarities are considered by computing the bilateral patch variances of each of the plurality of blocks, and the global information can be considered by computing Fourier coefficients corresponding to the pixels of the input noisy media frame (801). The Fourier coefficients can also be grouped into a plurality of blocks. As shown in FIG. 8, a frame depicting the local similarities (802) can be obtained (at the output of operation 203) and a frame depicting the global information (803) can be obtained (at the output of operation 205).

The embodiments include converting the Fourier trimmed media frame in Fourier space to a Fourier trimmed media frame in pixel space (obtained at the output of operation 207). The conversion can be achieved through inverse Fourier transform. The embodiments include converting the Fourier trimmed media frame in pixel space to a media frame in curvelet space (obtained at the output of operation 208). The conversion of the Fourier trimmed media frame in pixel space to a media frame in curvelet space involves computing curvelet transform for each pixel of the Fourier trimmed media frame in pixel space. The pixel information represented by the pixels of the Fourier trimmed media frame in pixel space is now represented by curvelet coefficients in the media frame in curvelet space. The curvelet transform results in obtaining a media frame highlighting texture (curvature) details in curvelet space and a media frame highlighting homogeneous details in curvelet space. This is because values of the curvelet coefficients, representing the regions (of the Fourier trimmed media frame in pixel space) highlighting the texture details, are likely to be higher, compared to values of the curvelet coefficients representing the regions highlighting the homogenous details.

The embodiments include performing sub-band decomposition (209) of the media frame highlighting texture details and the media frame highlighting homogeneous details. The sub-band decomposition involves downscaling the resolutions of the media frame highlighting the texture details and the media frame highlighting the homogeneous details, by a predetermined factor, at one or more levels. In an embodiment, the resolution of the media frame highlighting the texture details and the resolution of the media frame highlighting the homogeneous details is downscaled by a factor of two. For example, if the resolutions of the media frames highlighting the texture details and the homogeneous details is M×N, the resolutions of the media frames highlighting the texture details and the homogeneous details after downscaling will be M/2×N/2. The embodiments include obtaining the downscaled media frame highlighting the texture details (210) and the downscaled media frame highlighting the homogeneous details (211).

In an embodiment, as shown in FIG. 2A, the resolution of the media frame highlighting the texture details and the resolution of the media frame highlighting the homogeneous details is downscaled at a single level (209). In an embodiment, as shown in FIG. 2B, the resolution of the media frame highlighting the texture details is downscaled at two levels (209 and 214). Similarly, the resolution of the media frame highlighting the homogeneous details is downscaled at two levels (209 and 215). The downscaled media frame highlighting texture details can be subjected to longitudinal filtering (212), whereas the downscaled media frame highlighting homogeneous details can be subjected to latitudinal filtering (213).

The longitudinal filtering (212) involves computing a product of the downscaled media frame highlighting texture details (210) and a frame comprising bilateral longitudinal coefficients. The bilateral longitudinal coefficients can be obtained using a bilateral longitudinal filter kernel. The resolutions of the downscaled media frame highlighting texture details and the frame comprising bilateral longitudinal coefficients is same. For example, if the resolution of the downscaled media frame highlighting texture details (210) is M/2×N/2, then the resolution of the frame comprising bilateral longitudinal coefficients will also be M/2×N/2. The resolution of the product of the downscaled media frame highlighting texture details (210) and the frame comprising bilateral longitudinal coefficients is also same.

The bilateral longitudinal coefficients are dissimilar along the vertical direction (column). Thus, the elements or bilateral longitudinal coefficients along the columns of the frame comprising bilateral longitudinal coefficients are different, whereas the elements or bilateral longitudinal coefficients along the rows of the frame comprising bilateral longitudinal coefficients are same. Consider that M/2=3 and N/2=3. Thus, there will be 9 elements or bilateral longitudinal coefficients in the frame comprising bilateral longitudinal coefficients and the resolution will be 3×3. If an element of the frame comprising bilateral longitudinal coefficients is represented by $F_{ij}$, wherein i represents a row index and j represents a column index, then the values of the elements or bilateral longitudinal coefficients of frame comprising bilateral longitudinal coefficients will be: $F_{11}$=0.6, $F_{12}$=0.6, $F_{13}$=0.6, $F_{21}$=0.3, $F_{22}$=0.3, $F_{23}$=0.3, $F_{31}$=0.1, $F_{32}$=0.1, and $F_{33}$=0.1. Thus, the values of the elements or bilateral longitudinal coefficients differ along the columns and remain same along the rows.

Figure 9:
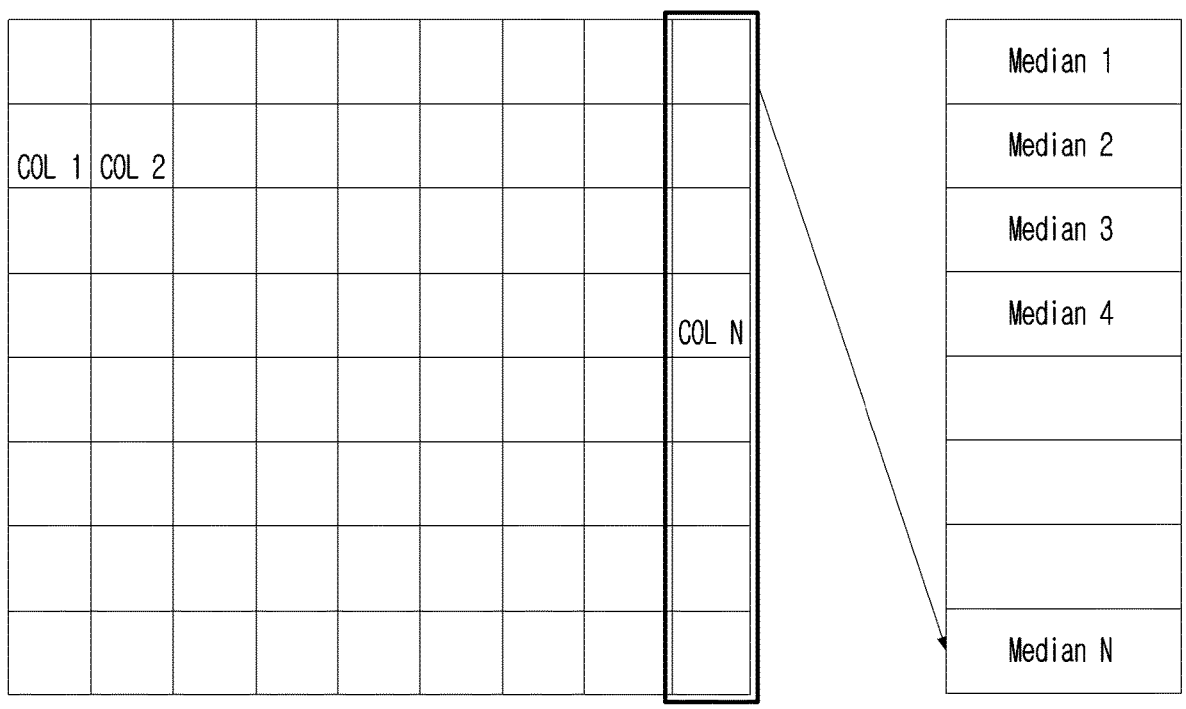
FIG. 9 shows an example frame of a product of a downscaled media frame highlighting texture details and a frame comprising bilateral longitudinal coefficients, according to embodiments.

If an element of the media frame highlighting texture details (210) is represented by $T_{ij}$, wherein i represents a row index and j represents a column index, then the values of the elements of the media frame highlighting texture details (210) will be $T_{11}$, $T_{12}$, $T_{13}$, $T_{21}$, $T_{22}$, $T_{23}$, $T_{31}$, $T_{32}$, and $T_{33}$. The resolution and the number of elements of the product of the downscaled media frame highlighting texture details (210) and the frame comprising bilateral longitudinal coefficients will be same (3×3 and 9), as the elements of the product will be $T_{11}*F_{11}$, $T_{12}*F_{12}$, $T_{13}*F_{13}$, $T_{21}*F_{21}$, $T_{22}*F_{22}$, $T_{23}*F_{23}$, $T_{31}*F_{31}$, $T_{32}*F_{32}$, and $T_{33}*F_{33}$. FIG. 9 shows an example frame of a product of the downscaled media frame highlighting texture details (210) and the frame comprising bilateral longitudinal coefficients, according to embodiments. As shown in FIG. 9, the product comprises N columns. Consider that the resolution of the media frame highlighting texture details, obtained by performing a curvelet transform (at operation 208) of the Fourier trimmed media frame in pixel space (obtained at the output of operation 207), is 2M×2N. If the resolution is downscaled (209) by a factor of 2, a downscaled media frame highlighting texture details (210) is obtained. The resolution of the downscaled media frame highlighting texture details (210) will be M×N, comprising of M rows and N columns. A frame comprising bilateral longitudinal coefficients having a resolution of M×N and M*N elements is used for obtaining the product (shown in FIG. 9).

Figure 10:
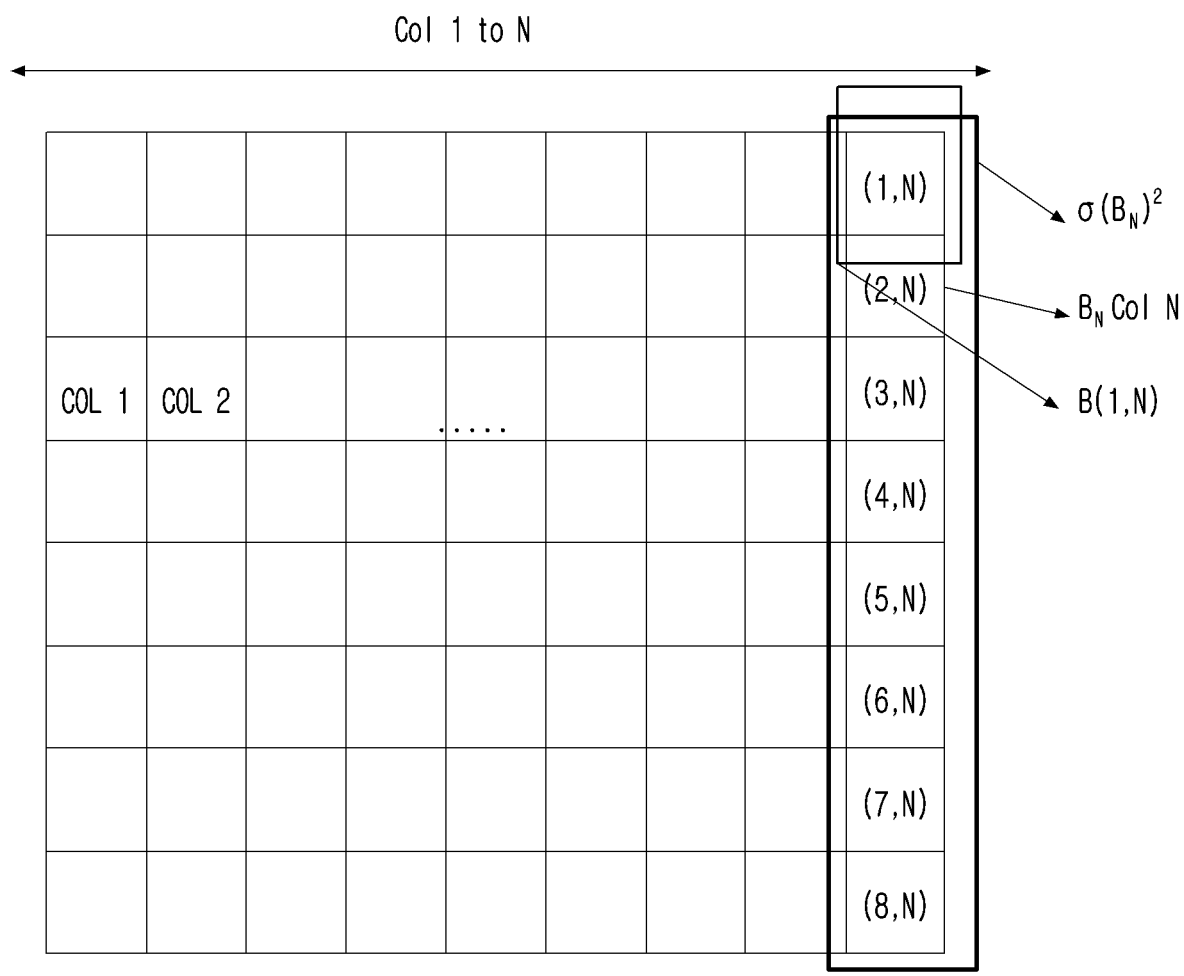
FIG. 10 shows an example longitudinal filtering performed on the product based on curvelet medians and curvelet variances of elements of the columns of the product, according to embodiments.

The embodiments include obtaining a curvelet median of elements of each column of the product, and a curvelet variance of the elements of each column of the product. As the product comprises N columns, the embodiments include computing N curvelet medians and N curvelet variances. FIG. 10 shows an example performance of longitudinal filtering (212) based on curvelet medians and curvelet variances of elements of the columns of the product of the downscaled media frame highlighting texture details (210) and the frame comprising bilateral longitudinal coefficients, according to embodiments. The embodiments include performing longitudinal filtering (212) on the product based on each element of the product, curvelet medians of the elements of the columns of the product, and the curvelet variances of the elements of the columns of the product. Consider that each element of the product is represented as B (i, j) with i→(1-M) and j→(1-N), wherein i represents a row index and j represents a column index; the curvelet median of the elements of a column of the product is represented as $B_c$, wherein C→(1-N); and the curvelet variance of the elements of a column of the product is represented as $\sigma(B_c)^2$ wherein C→(1-N). The longitudinal filtering (212) is performed by performing the following operation for each row element ($B_c$ (i, j)) along each column (C=j) of the product of the downscaled media frame highlighting texture details (210) and the frame comprising bilateral longitudinal coefficients:

$$\exp(-(B_c-B_c(i,j))^\wedge 2/(2*\sigma(B_c)^2));$$

This operation results in obtaining a longitudinal filtered media frame in curvelet space. The texture details (210) present in the Fourier trimmed media frame in pixel space (obtained at operation 208) can be enhanced through longitudinal filtering (212).

The latitudinal filtering (213) involves computing a product of the downscaled media frame highlighting homogeneous details (211) and a frame comprising bilateral latitudinal coefficients. The bilateral latitudinal coefficients can be obtained using a bilateral latitudinal filter kernel. The resolutions of the downscaled media frame highlighting homogeneous details and the frame comprising bilateral latitudinal coefficients is same. For example, if resolution of the downscaled media frame highlighting homogeneous details (211) is M/2×N/2, then the resolution of the frame comprising bilateral latitudinal coefficients will also be M/2×N/2. The resolution of the product of the downscaled media frame highlighting homogeneous details (211) and the frame comprising bilateral latitudinal coefficients is also same.

The bilateral latitudinal coefficients are dissimilar along the horizontal direction (column). Thus, the elements or bilateral latitudinal coefficients along the rows of the frame comprising bilateral latitudinal coefficients are different, whereas the elements or bilateral latitudinal coefficients along the columns of the frame comprising bilateral latitudinal coefficients are same. Consider that M/2=3 and N/2=6. Thus, there will be 9 elements or bilateral latitudinal coefficients in the frame comprising bilateral latitudinal coefficients and the resolution will be 3×3. If an element of the frame comprising bilateral latitudinal coefficients is represented by $G_{ij}$, wherein i represents a row index and j represents a column index, then the values of the elements or bilateral longitudinal coefficients of frame comprising bilateral latitudinal coefficients will be: $G_{11}$=0.6, $G_{12}$=0.3, $G_{13}$=0.1, $G_{21}$=0.6, $G_{22}$=0.3, $G_{23}$=0.1, $G_{31}$=0.6, $G_{32}$=0.3, and $G_{33}$=0.1. Thus, values of the elements or bilateral latitudinal coefficients differ along the rows and remain same along the columns.

Figure 11:
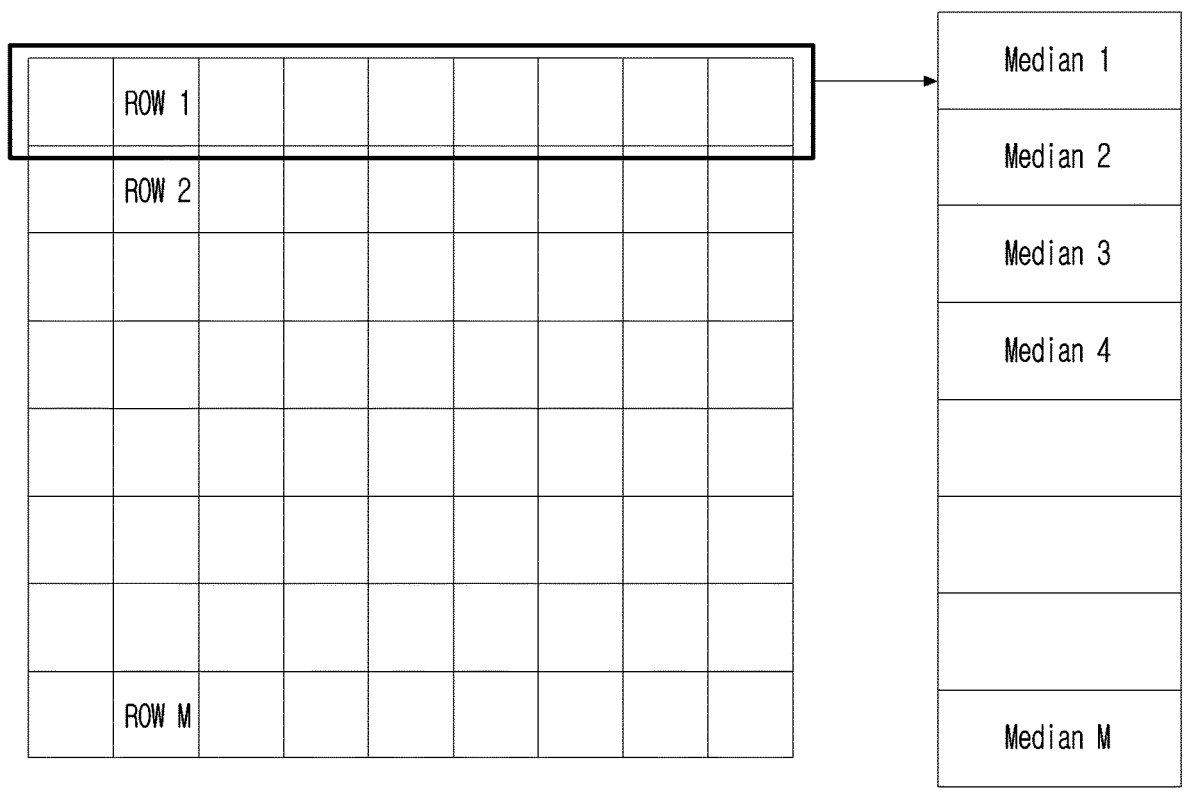
FIG. 11 shows an example frame of a product of a downscaled media frame highlighting homogeneous details and a frame comprising bilateral latitudinal coefficients, according to embodiments.

If an element of the media frame highlighting homogeneous details (211) is represented by $H_{ij}$, wherein i represents a row index and j represents a column index, then the values of the elements of the media frame highlighting homogeneous details (211) will be $H_{11}$, $H_{12}$, $H_{13}$, $H_{21}$, $H_{22}$, $H_{23}$, $H_{31}$, $H_{32}$, and $H_{33}$ The resolution and the number of elements of the product of the downscaled media frame highlighting homogeneous details (211) and the frame comprising bilateral latitudinal coefficients will be same (3×3 and 9), as the elements of the product will be $H_{11}*G_{11}$, $H_{12}*G_{12}$, $H_{13}*G_{13}$, $H_{21}*G_{21}$, $H_{22}*G_{22}$, $H_{23}*G_{23}$, $H_{31}*G_{31}$, $H_{32}*G_{32}$, and $H_{33}*G_{33}$. FIG. 11 shows an example frame of a product of the downscaled media frame highlighting homogeneous details (211) and the frame comprising bilateral latitudinal coefficients, according to embodiments. As shown in FIG. 11, the product comprises N rows. Consider that the resolution of the media frame highlighting homogeneous details, obtained by performing a curvelet transform (208) of the Fourier trimmed media frame in pixel space (obtained at operation 207), is 2M×2N. If the resolution of the media frame highlighting homogeneous details is downscaled (209) by a factor of 2, a downscaled media frame highlighting homogeneous details (211) is obtained. The resolution of the downscaled media frame highlighting homogeneous details (211) will be M×N, comprising of M rows and N columns. A frame comprising bilateral latitudinal coefficients having a resolution of M×N and M*N elements is used for obtaining the product (as shown in FIG. 11).

Figure 12:
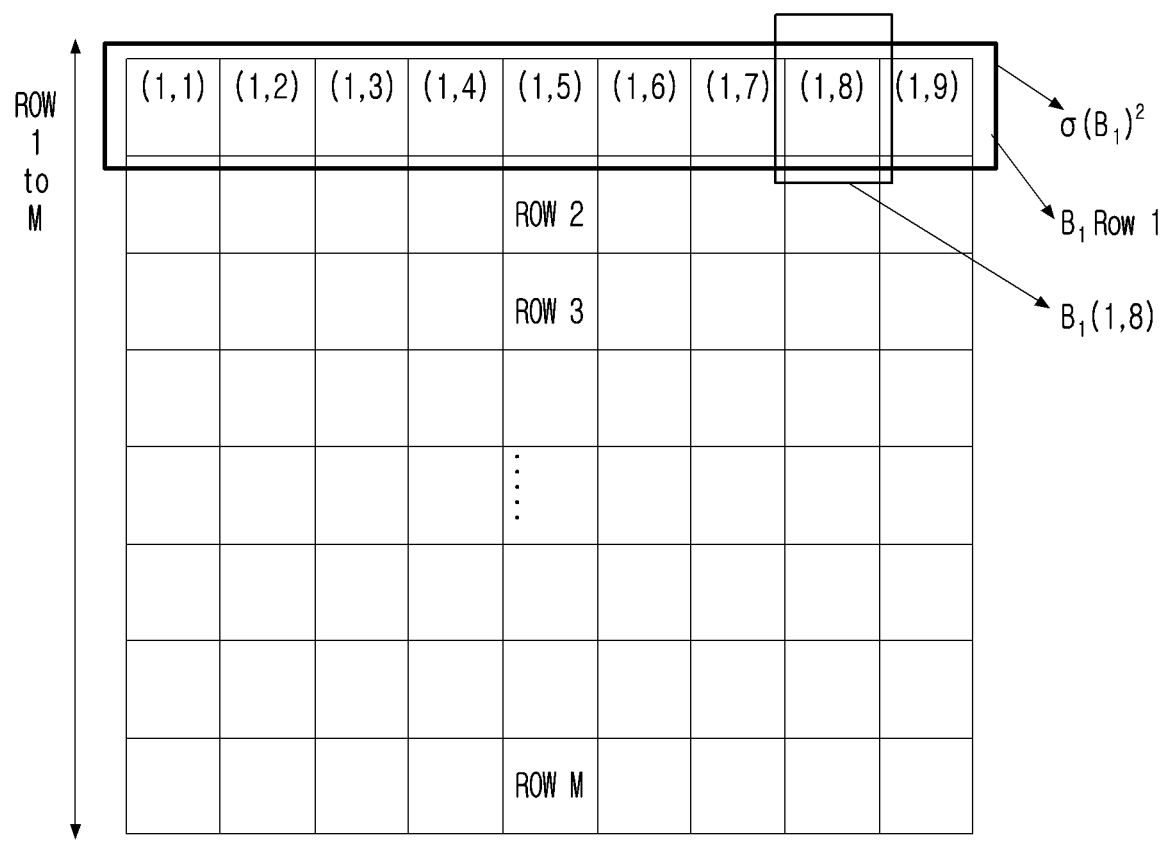
FIG. 12 shows an example latitudinal filtering performed on the product based on curvelet medians and curvelet variances of elements of the rows of the product, according to embodiments.

The embodiments include obtaining a curvelet median of elements of each row of the product, and a curvelet variance of the elements of each row of the product. As the product comprises M rows, the embodiments include computing M curvelet medians and M curvelet variances. FIG. 12 shows an example performance of latitudinal filtering (213) based on curvelet medians and curvelet variances of elements of the rows of the product of the downscaled media frame highlighting homogeneous details (211) and the frame comprising bilateral latitudinal coefficients, according to embodiments. The embodiments include performing latitudinal filtering (213) on the product based on each element of the product, curvelet medians of the elements of the rows of the product, and the curvelet variances of the elements of the rows of the product. Consider that each element of the product is represented as B (i, j) with i→(1-M) and j→(1-N), wherein i represents a row index and j represents a column index; the curvelet median of the elements of a row of the product is represented as $B_R$, wherein R→(1-M); and the curvelet variance of the elements of a column of the row is represented as $\sigma(B_R)^2$ wherein R→(1-M). The latitudinal filtering (213) is performed by performing the following operation for each column element ($B_R$ (i, j)) along each row (R=i) of the product of the downscaled media frame highlighting homogeneous details (211) and the frame comprising bilateral latitudinal coefficients:

$$\exp(-(B_R - B_R(i,j))^{\wedge}2/(2*\sigma(B_R)^2));$$

This operation results in obtaining a latitudinal filtered media frame in curvelet space. The homogeneous details (211) present in the Fourier trimmed media frame in pixel space (obtained at operation 208) is enhanced through latitudinal filtering (213).

The longitudinal filtered media frame in curvelet space can be integrated (214) with the latitudinal filtered media frame in curvelet space to obtain a curvelet filtered media frame in curvelet space (output of operation 214). The curvelet filtered media frame in curvelet space can be subjected to inverse sub-band decomposition (215), wherein the resolution of the curvelet filtered media frame in curvelet space is upscaled to obtain a curvelet denoised media frame in curvelet space. The curvelet denoised media frame is having a resolution of M×N (output of operation 215). The curvelet denoised media frame is a smoothened media frame.

Figure 13:
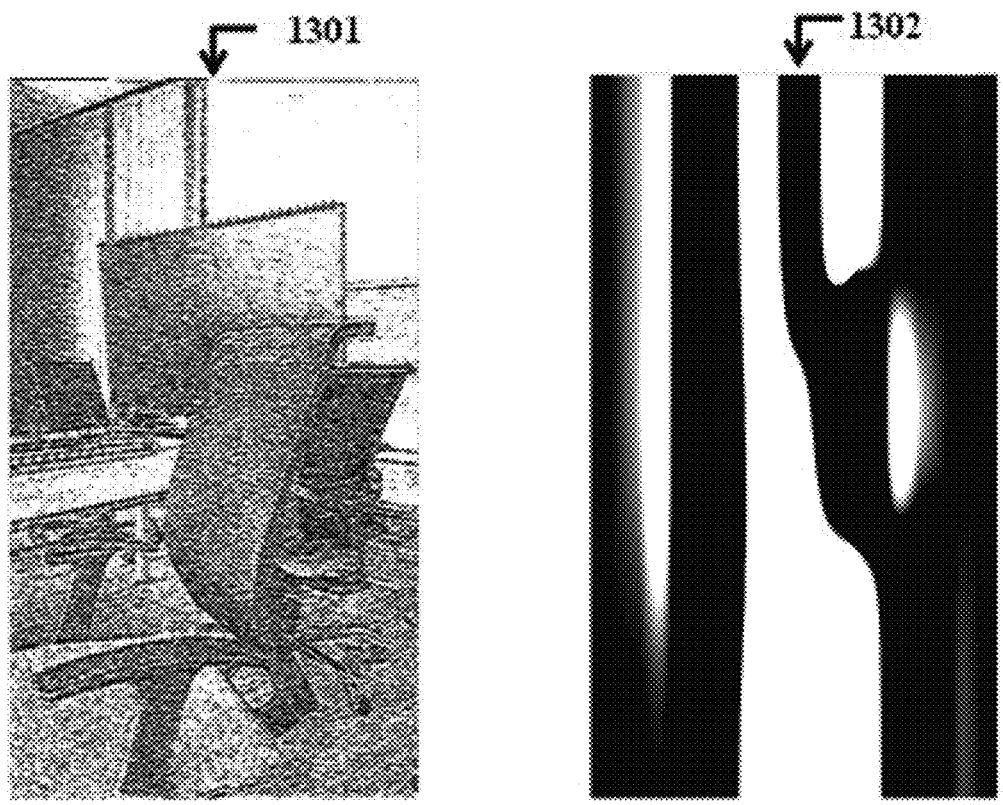
FIG. 13 shows an example texture frame highlighting texture details of a media frame in curvelet space, and an example frame comprising bilateral longitudinal coefficients, which is used for enhancing the texture details, according to embodiments.

FIG. 13 shows an example texture frame (1301) highlighting texture details of a media frame in curvelet space, and an example frame comprising bilateral longitudinal coefficients (1302), which is used for enhancing the texture details, according to embodiments. The media frame in curvelet space (having a resolution M×N) is obtained by performing a curvelet transform of a Fourier trimmed media frame in pixel space, wherein the Fourier trimmed media frame in pixel space is obtained by performing adaptive Fourier trimming of Fourier coefficients of the input noisy media frame (801). The frame comprising the bilateral longitudinal coefficients (1302) can be used for longitudinal filtering of the downscaled texture frame (1301). In an embodiment, the texture frame (1301) is downscaled by a factor of 2. The resolution of the downscaled texture frame (1301) and the frame comprising the bilateral longitudinal coefficients (1302) can be M/2×N/2.

Figure 14:
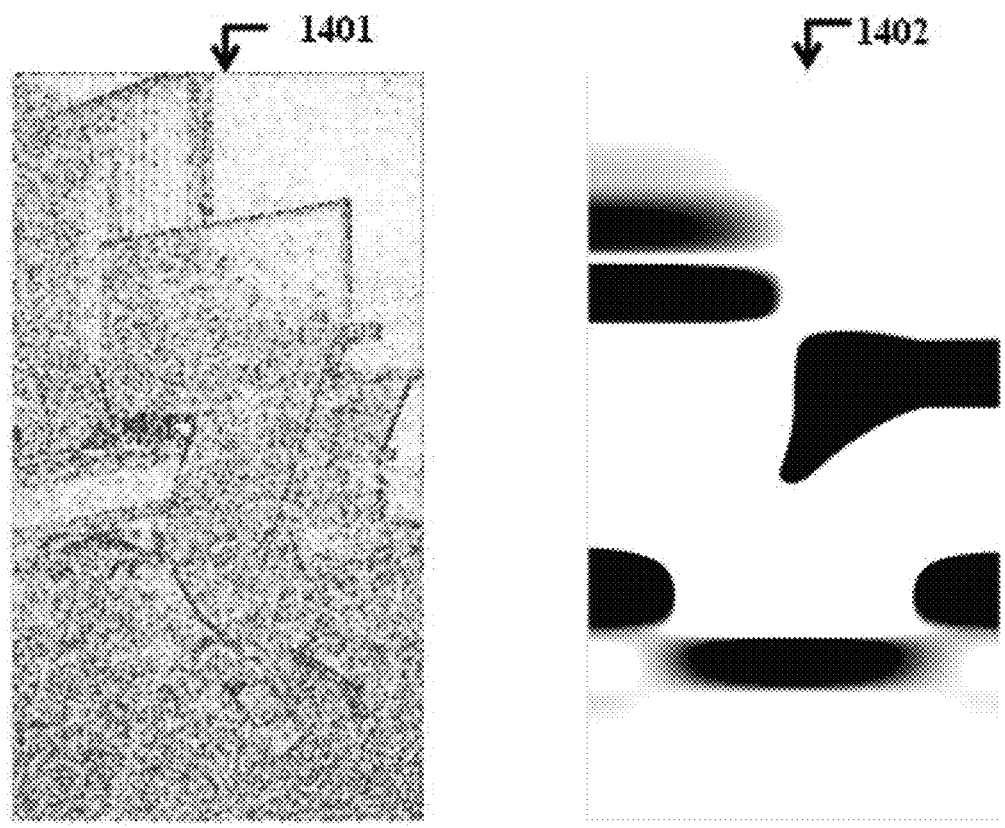
FIG. 14 shows an example homogeneous frame highlighting homogeneous details of a media frame in curvelet space, and an example frame comprising bilateral latitudinal coefficients, which used for enhancing the homogeneous details, according to embodiments.

FIG. 14 shows an example homogeneous frame (1401) highlighting homogeneous details of a media frame in curvelet space, and an example frame comprising bilateral latitudinal coefficients (1402), which used for enhancing the homogeneous details, according to embodiments. The media frame in curvelet space (having a resolution M×N) is obtained by performing a curvelet transform of a Fourier trimmed media frame in pixel space, wherein the Fourier trimmed media frame in pixel space is obtained by performing adaptive Fourier trimming of Fourier coefficients of the input noisy media frame (801). The frame comprising the bilateral latitudinal coefficients (1402) can be used for latitudinal filtering of the downscaled homogeneous frame (1401). In an embodiment, the homogeneous frame (1401) is downscaled by a factor of 2. The resolution of the downscaled homogeneous frame (1401) and the frame comprising the bilateral latitudinal coefficients (1402) can be M/2×N/2.

In an embodiment, as shown in FIG. 2B, the longitudinal filtered media frame in curvelet space can be subjected to a second sub-band decomposition (218). Similarly, the latitudinal filtered media frame in curvelet space can be subjected to a second sub-band decomposition (219). The resolutions of the longitudinal filtered media frame and the latitudinal filtered media frame can be downscaled by the same factor. For example, if the resolutions of the longitudinal filtered media frame and the latitudinal filtered media frame is M/2×N/2, the resolutions of the downscaled longitudinal filtered media frame and the downscaled latitudinal filtered media frame will be M/4×N/4. The embodiments include obtaining the downscaled longitudinal filtered media frame, which can be referred to as second downscaled media frame highlighting texture details (220). The embodiments include obtaining the downscaled latitudinal filtered media frame, which can be referred to as second downscaled media frame highlighting homogeneous details (221).

The second downscaled media frame highlighting texture details (220) can be subjected to further longitudinal filtering (222) using bilateral longitudinal coefficients, wherein resolution of a frame comprising the bilateral longitudinal coefficients is having is same as that of the second downscaled media frame highlighting texture details (220) (M/4×N/4). The longitudinal filtering (222) results in obtaining a final longitudinal filtered media frame in curvelet space. The texture details (210 and 220) present in the Fourier trimmed media frame in pixel space (obtained at operation 208) is enhanced through longitudinal filtering (212 and 222).

The second downscaled media frame highlighting homogeneous details (221) can be subjected to further latitudinal filtering (223) using bilateral latitudinal coefficients, wherein resolution of a frame comprising the bilateral latitudinal coefficients is same as that of the second downscaled media frame highlighting homogeneous details (221) (M/4×N/4). The latitudinal filtering (223) results in obtaining a final latitudinal filtered media frame in curvelet space. The homogeneous details (211 and 221) present in the Fourier trimmed media frame in pixel space (obtained at operation 208) is enhanced through latitudinal filtering (213 and 223).

The final longitudinal filtered media frame in curvelet space (if sub-band decomposition takes place in two levels, as shown in FIG. 2B) can be integrated (214) with the final latitudinal filtered media frame in curvelet space (if sub-band decomposition takes place in two levels, as shown in FIG. 2B) to obtain a final curvelet filtered media frame in curvelet space (output of operation 214). The final curvelet filtered media frame in curvelet space can be subjected to inverse sub-band decomposition (215), wherein the resolution of the final curvelet filtered media frame in curvelet space is upscaled in two stages to obtain the curvelet denoised media frame in curvelet space. The curvelet denoised media frame is having a resolution of M×N (output of operation 215). The curvelet denoised media frame is a smoothened media frame.

Figure 15:
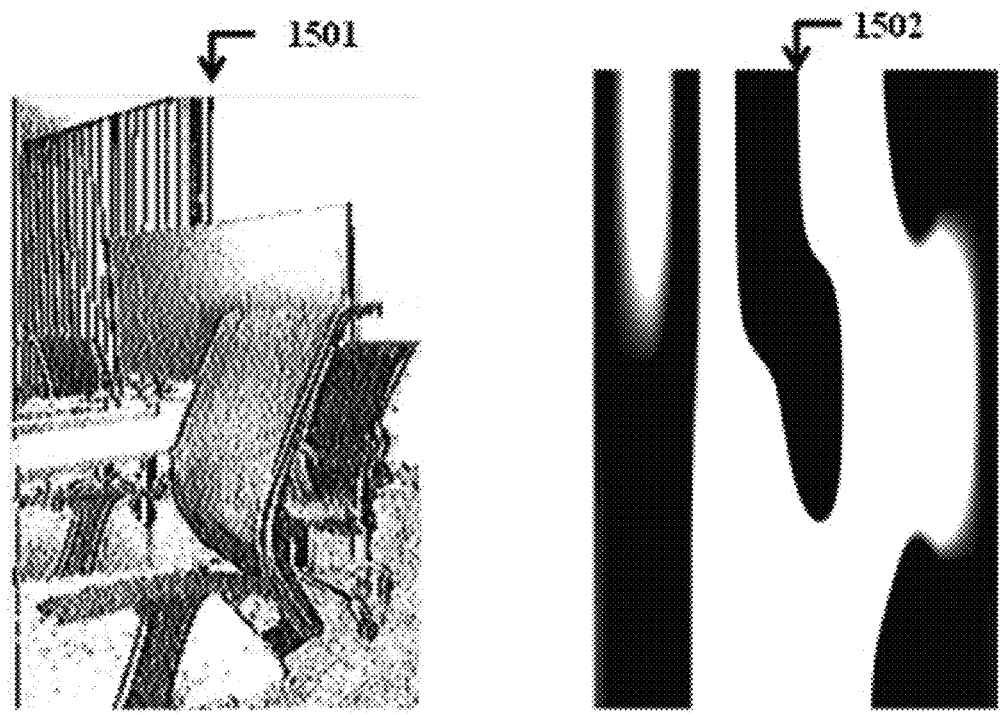
FIG. 15 shows an example second downscaled texture frame highlighting texture details of a media frame in curvelet space, and an example frame comprising bilateral longitudinal coefficients, which is used for enhancing the texture details in the second downscaled texture frame, according to embodiments.

FIG. 15 shows an example second downscaled texture frame (1501) highlighting texture details of a media frame in curvelet space, and an example frame comprising bilateral longitudinal coefficients (1502), which is used for enhancing the texture details in the second downscaled texture frame (1501), according to embodiments. The media frame in curvelet space (having a resolution M×N) is obtained by performing a curvelet transform of a Fourier trimmed media frame in pixel space, wherein the Fourier trimmed media frame in pixel space is obtained by performing adaptive Fourier trimming of Fourier coefficients of the input noisy media frame (801). The frame comprising the bilateral longitudinal coefficients (1502) can be used for longitudinal filtering (222) of the second downscaled texture frame (1501). In an embodiment, the second downscaled texture frame (1501) is obtained by downscaling the longitudinal filtered media frame by a factor of 2. The resolution of the second downscaled texture frame (1501) and the frame comprising the bilateral longitudinal coefficients (1502) is M/4×N/4.

Figure 16:
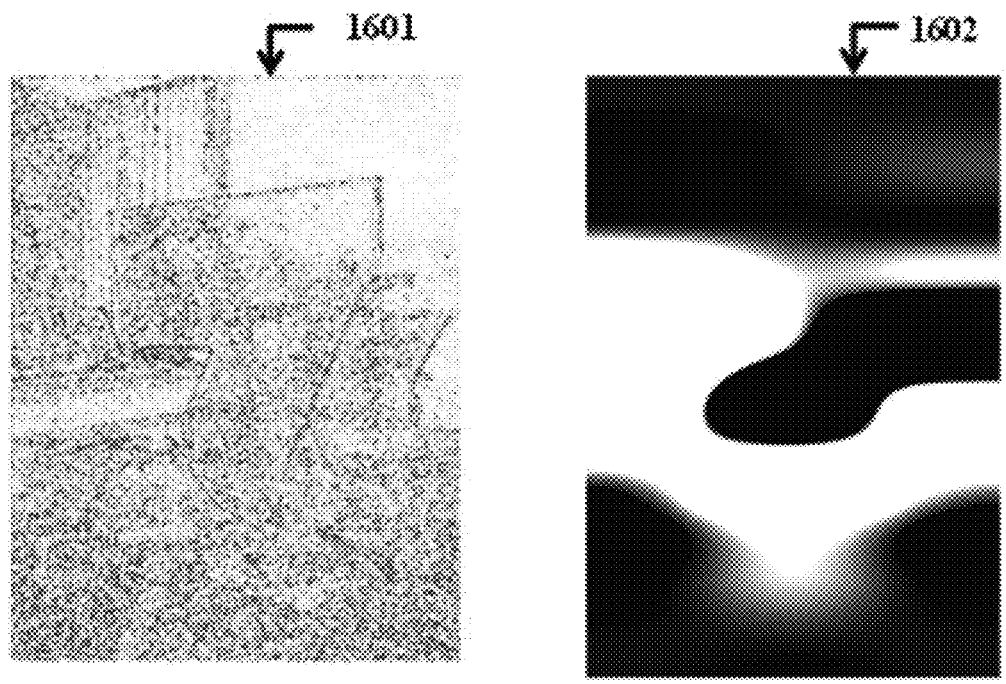
FIG. 16 shows an example second downscaled homogeneous frame highlighting homogeneous details of a media frame in curvelet space, and an example frame comprising bilateral latitudinal coefficients, which is used for enhancing the homogeneous details in the second downscaled homogeneous frame, according to embodiments.

FIG. 16 shows an example second downscaled homogeneous frame (1601) highlighting homogeneous details of a media frame in curvelet space, and an example frame comprising bilateral latitudinal coefficients (1602), which is used for enhancing the homogeneous details in the second downscaled homogeneous frame (1601), according to embodiments. The media frame in curvelet space (having a resolution M×N) is obtained by performing a curvelet transform of a Fourier trimmed media frame in pixel space, wherein the Fourier trimmed media frame in pixel space is obtained by performing adaptive Fourier trimming of Fourier coefficients of the input noisy media frame (801). The frame comprising the bilateral latitudinal coefficients (1602) can be used for latitudinal filtering (223) of the second downscaled homogeneous frame (1601). In an embodiment, the second downscaled homogeneous frame (1601) is obtained by downscaling the latitudinal filtered media frame by a factor of 2. The resolution of the second downscaled homogeneous frame (1601) and the frame comprising the bilateral latitudinal coefficients (1602) is M/4×N/4.

Figure 17:
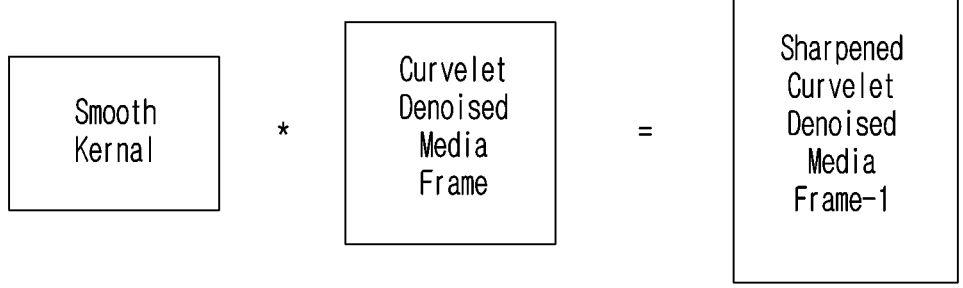
FIG. 17 is a block diagram depicting the sharpening of a curvelet denoised media frame using a curvelet denoised prior, according to embodiments.
Figure 17:
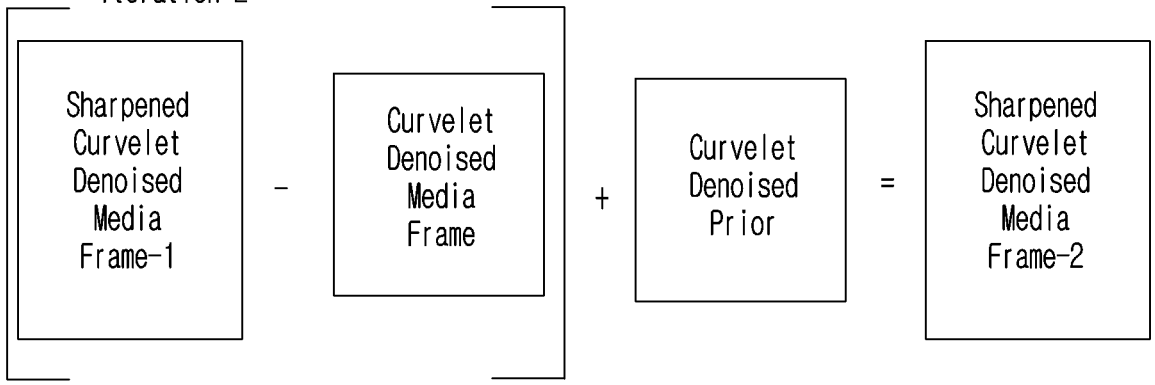
Figure 17:
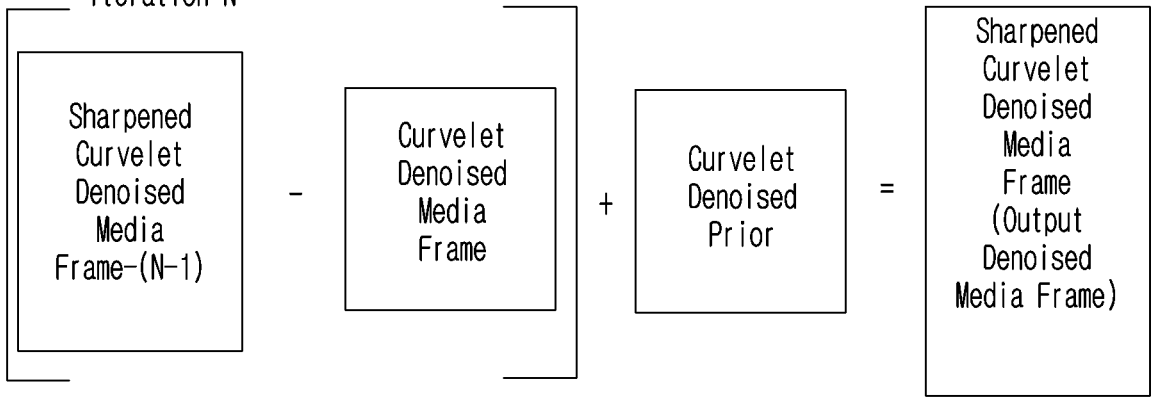

The embodiments include sharpening the curvelet denoised media frame in curvelet space in a plurality of iterations. The curvelet denoised media frame in curvelet space can be provided to a joined repetitive denoising and sharpening operation (216) for filtering multiplicative noise present in the input noisy media frame (201). The filtering of the multiplicative noise leads to the sharpening the curvelet denoised media frame in curvelet space. FIG. 17 is a block diagram depicting the sharpening of a curvelet denoised media frame using a curvelet denoised prior, according to embodiments. The multiplicative noise can be filtered gradually in a series of iterations. In the first iteration, the curvelet denoised media frame can be convoluted with a smooth kernel (such as uniform blur kernel) to obtain a first sharpened denoised media frame in curvelet space.

The sharpness of the first sharpened denoised media frame in curvelet space can be improved by subtracting the curvelet denoised media frame in curvelet space from the first sharpened denoised media frame in curvelet space. The result of the subtraction can be integrated with the Fourier trimmed media frame in curvelet space (obtained at operation 208) to obtain a second sharpened media frame in curvelet space. The Fourier trimmed media frame in curvelet space (at the output of operation 208) can be considered as the curvelet denoised prior. The Fourier trimmed media frame in curvelet space (at the output of operation 208), provided to the joined repetitive denoising and sharpening operation (216), can be utilized along with the curvelet denoised media frame (output of operation 215) in every iteration (starting from the 2nd iteration). The iterations can continue until the final denoised media frame in curvelet space is obtained. The final denoised media frame in curvelet space is the sharp curvelet denoised media frame. The embodiments include converting the sharp curvelet denoised media frame in curvelet space to an output denoised media frame in pixel space (217).

FIGS. 18A-20a depict example input noisy media frames, and a highlighted portion of each input noisy media frame, according to embodiments. FIGS. 18B, 19B, and 20B depict example output denoised media frames and a highlighted portion of each output denoised media frame, generated by denoising the highlighted portion of the respective input noisy media frames shown in FIGS. 18A, 19A, and 20A, according to embodiments. The effect of noise present in the darker regions or low-light regions of input noisy media frames (shown in FIGS. 18A, 19A and 20A) have been minimized or reduced in the output denoised media frames (shown in FIGS. 18B, 19B and 20B), which have been obtained after processing input noisy media frame using the operations (201-223). The embodiments identify the low-light regions in the input noisy media frames (shown in FIGS. 18A, 19A and 20A), wherein pixel values are likely to be mapped close to zero. The embodiments preserve the edge details of objects present in the input noisy media frames (shown in FIGS. 18A, 19A and 20A) in the output denoised media frames (shown in FIGS. 18B, 19B and 20B). The denoising in the color space of the input noisy media frames (shown in FIGS. 18A, 19A and 20A) has not affected color quality of the output denoised media frames (shown in FIGS. 18B, 19B and 20B).

Figure 18A:
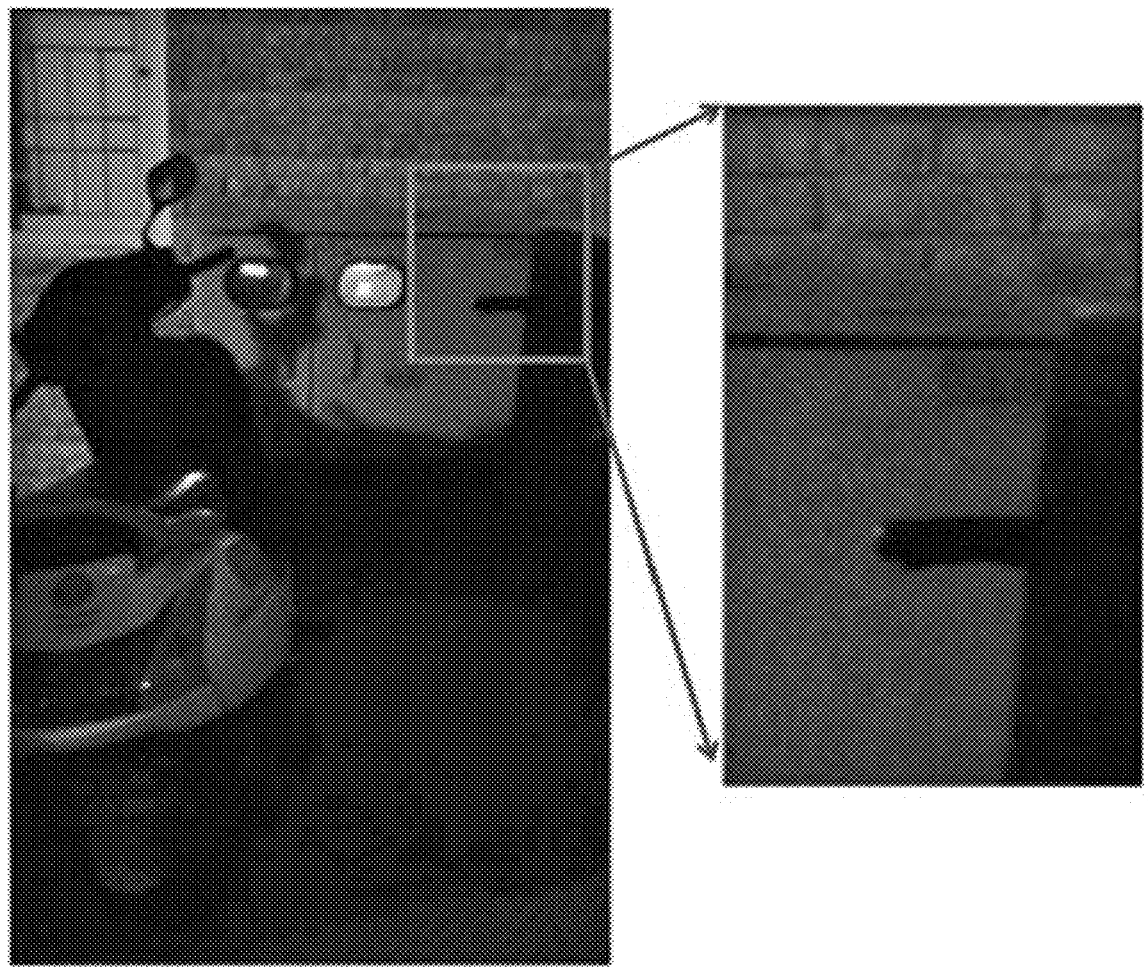
FIGS. 18A, 19A, and 20A show example input noisy media frames, and a highlighted portion of each input noisy media frame, according to embodiments.
Figure 18B:
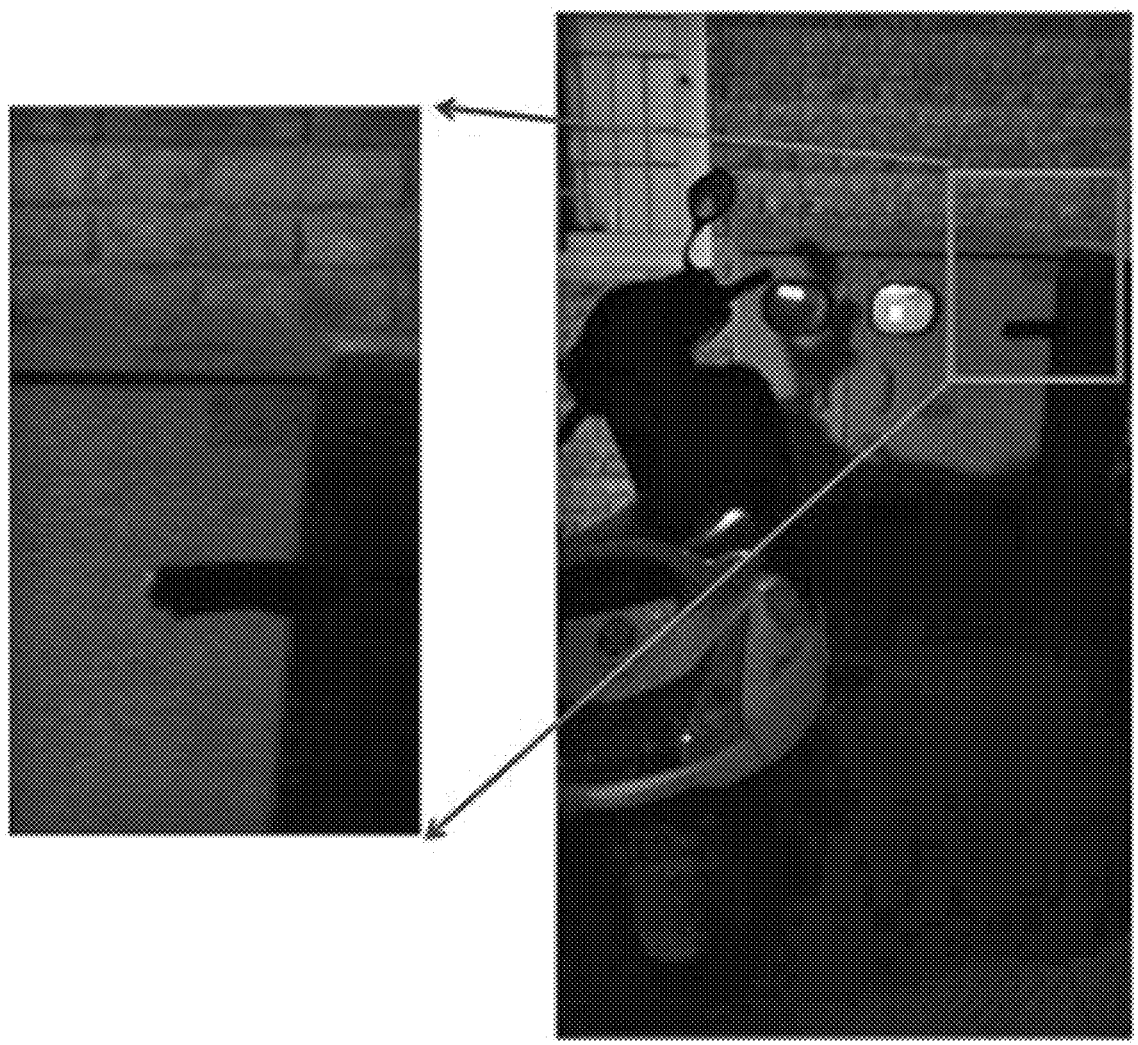
FIGS. 18B, 19B, and 20B show example output denoised media frames and a highlighted portion of each output denoised media frame, generated by denoising the highlighted portion of the respective input noisy media frames shown in FIGS. 18A, 19A, and 20A, according to embodiments.
Figure 19A:
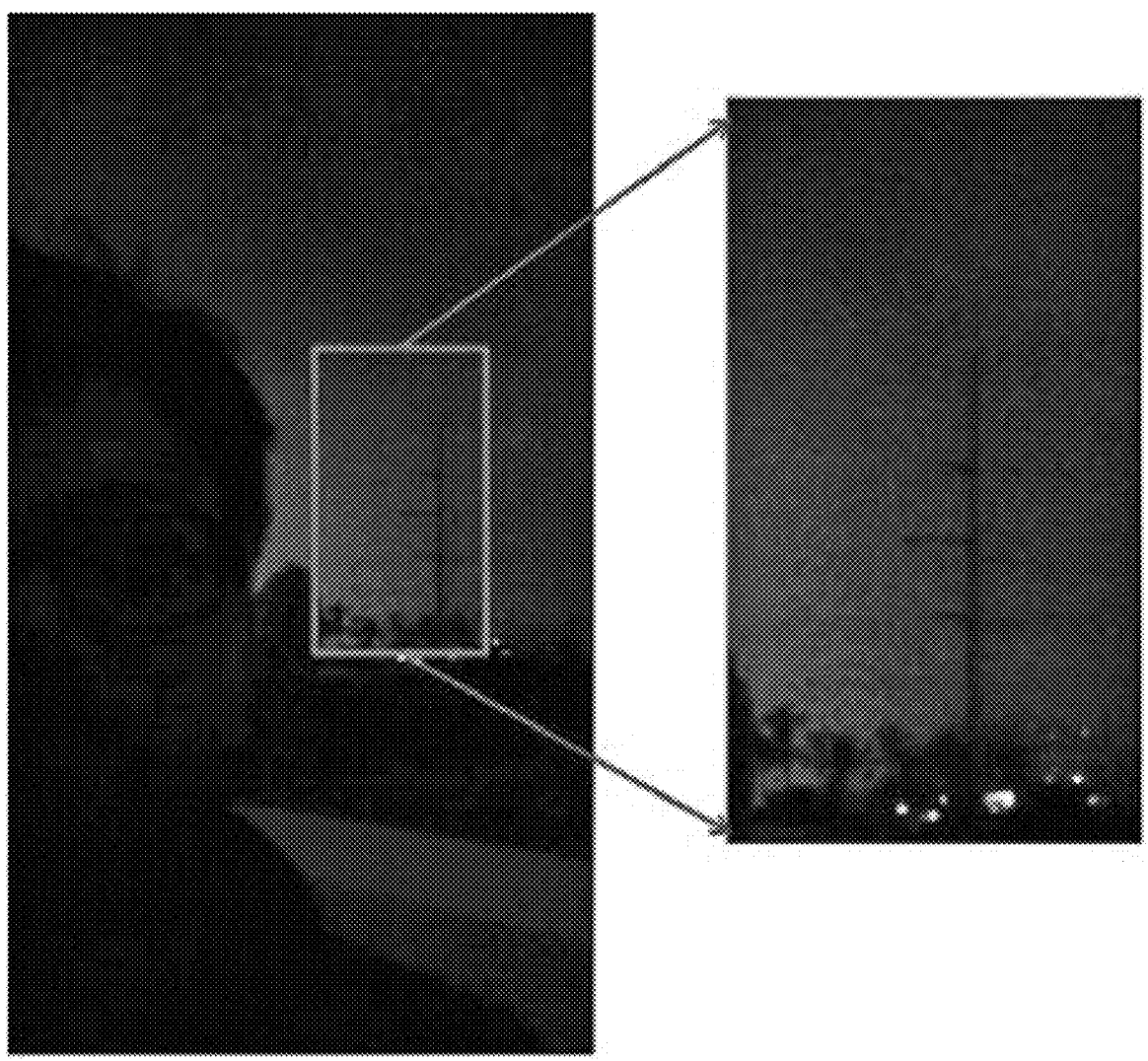
Figure 19B:
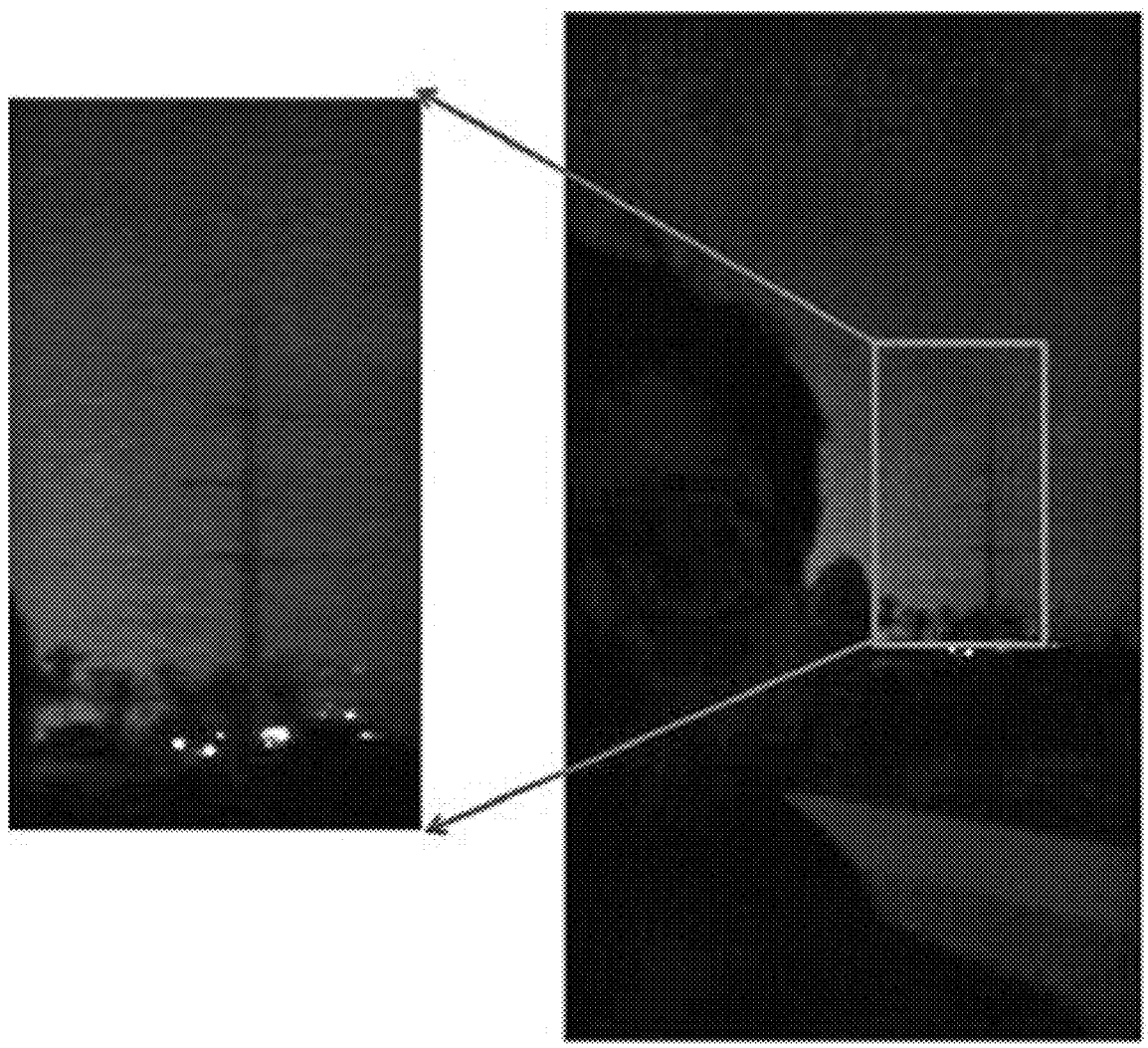
Figure 20A:
Figure 20B:
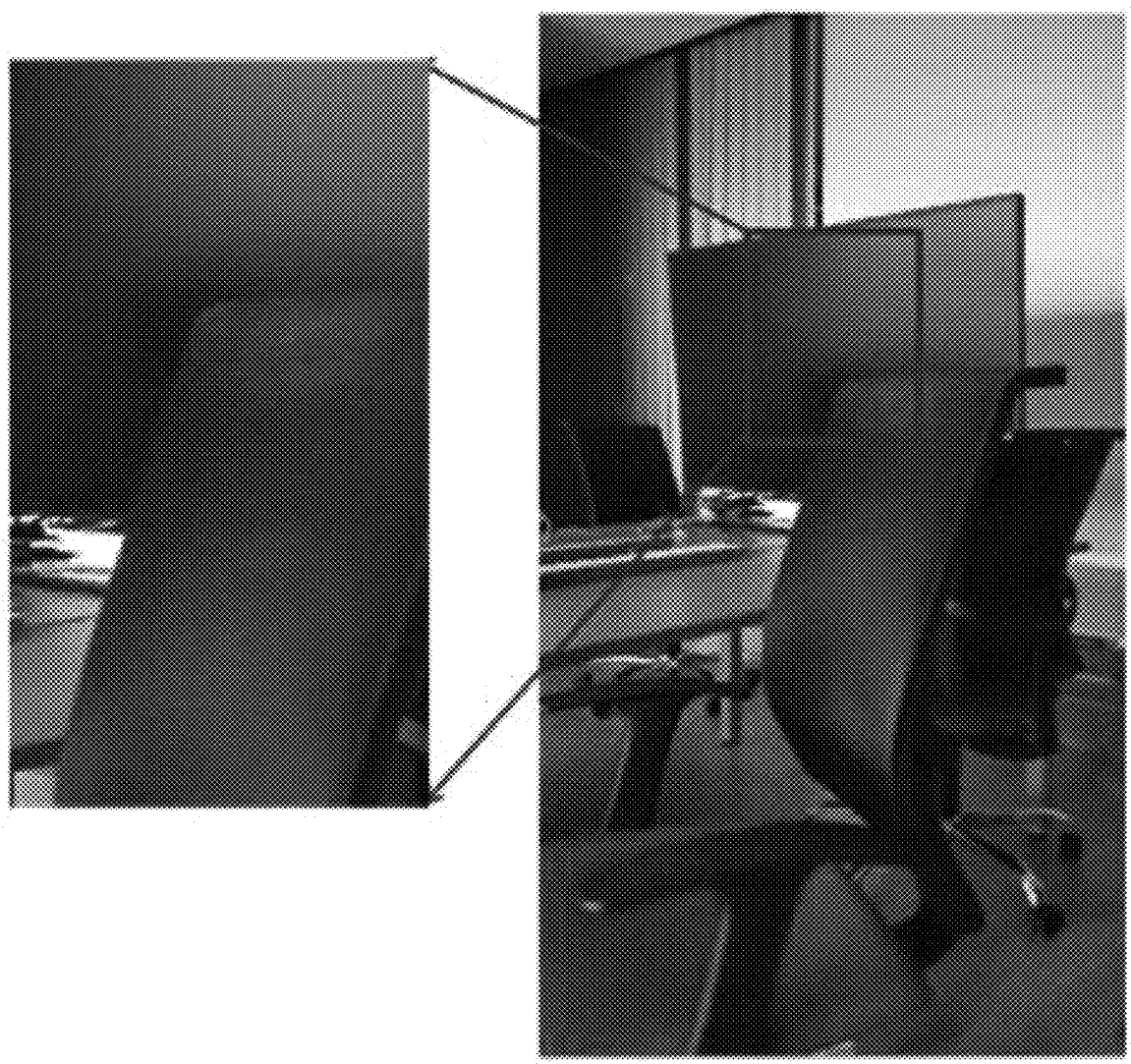

As shown in FIG. 18A, the highlighted grey region of the electric box can be considered as low-light region, wherein pixel values are mapped close to zero. As shown in the highlighted region in FIG. 18B, corners and edges of the electric box and the brick separators have been preserved in the output denoised media frame. As shown in FIG. 19A, the entire media frame can be considered as low-light region, wherein pixel values are mapped close to zero. The noise present in the low-light region of the highlighted portion of the output denoised media frame (shown in FIG. 19B) has reduced significantly. As shown in FIG. 19B, the corners and edges of the trees and the pole have been preserved in the output denoised media frame. As shown in FIG. 20A, the dark region of the chair can be considered as low-light region, wherein pixel values are mapped close to zero. The noise present in the low-light region of the highlighted portion of the output denoised media frame (shown in FIG. 20B) has reduced. As shown in the highlighted region in FIG. 20B, corners and edges of the chair and monitor have been preserved in the output denoised media frame.

The embodiments disclosed herein can be implemented through at least one software program running on at least one hardware device and performing network management functions to control the network elements. The network elements shown in FIGS. 1, 2A, and 2B, include blocks which can be at least one of a hardware device, or a combination of hardware device and software module.

The embodiments disclosed herein describe methods and systems for denoising media frames captured in low-light environment. Therefore, it is understood that the scope of the protection is extended to such a program and in addition to a computer readable means having a message therein, such computer readable storage means contain program code means for implementation of one or more operations of the method, when the program runs on a server or mobile device or any suitable programmable device. The method is implemented in a preferred embodiment through or together with a software program written in example Very high speed integrated circuit Hardware Description Language (VHDL), or any other programming language, or implemented by one or more VHDL or several software modules being executed on at least one hardware device. The hardware device can be any kind of portable device that can be programmed. The device may also include means, which could be, for example, a hardware means, for example, an Application-specific Integrated Circuit (ASIC), or a combination of hardware and software means, for example, an ASIC and a Field Programmable Gate Array (FPGA), or at least one microprocessor and at least one memory with software modules located therein. The method embodiments described herein could be implemented partly in hardware and partly in software. Alternatively, embodiments may be implemented on different hardware devices, e.g. using a plurality of Central Processing Units (CPUs).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

What is claimed is:

1. A method for denoising at least one media frame captured in a low-light environment, the method comprising:

obtaining a Fourier trimmed media frame in pixel space by an adaptive trimming of Fourier coefficients of an input media frame based on a Fourier block threshold criterion, wherein the Fourier coefficients are obtained by performing a Fourier transform of the input media frame;

obtaining a Fourier trimmed media frame in curvelet space by performing a curvelet transform on the Fourier trimmed media frame in pixel space;

extracting a texture frame based on texture details present in the Fourier trimmed media frame in pixel space, and a homogeneous frame based on homogeneous details present in the Fourier trimmed media frame in pixel space, by performing a curvelet transform of the Fourier trimmed media frame in pixel space;

obtaining a longitudinal filtered texture frame by performing at least one longitudinal filtering of the texture frame, wherein the texture frame is downscaled by a predefined factor prior to the at least one longitudinal filtering;

obtaining a latitudinal filtered homogeneous frame by performing at least one latitudinal filtering of the homogeneous frame, wherein the homogeneous frame is downscaled by the predefined factor prior to the at least one latitudinal filtering;

extracting a curvelet denoised media frame in curvelet space by integrating the longitudinal filtered texture frame and the latitudinal filtered homogeneous frame to form an integrated frame, and upscaling the frame; and obtaining an output denoised media frame by sharpening the curvelet denoised media frame in curvelet space in a plurality of iterations, wherein at each iteration a partially sharpened curvelet denoised media frame in curvelet space is obtained, wherein the sharpening at each iteration is performed based on a partially sharpened curvelet denoised media frame in curvelet space obtained at a previous iteration, the curvelet denoised media frame in curvelet space, and the Fourier trimmed media frame in curvelet space.

2. The method as claimed in claim 1, wherein the Fourier coefficients of the input media frame are grouped into a plurality of blocks based on spatial arrangement of pixels, represented by the Fourier coefficients, in the input media frame, and wherein the Fourier block threshold criterion comprises a plurality of a Fourier block threshold respectively determined for each of the plurality of blocks based on a bilateral patch variance of each of the plurality of blocks and a maximum Fourier coefficient value of each of the plurality of blocks.

3. The method as claimed in claim 2, wherein the bilateral patch variance of each of the plurality of blocks is determined based on a Fourier transform of a standard deviation of each of the plurality of blocks of the input media frame.

4. The method as claimed in claim 2, wherein Fourier coefficients in each of the plurality of blocks are adaptively trimmed by converting the Fourier coefficients in each of the plurality of blocks to zero, if the Fourier coefficients in each of the plurality of blocks are determined to be less than the Fourier block threshold corresponding to each of the plurality of blocks.

5. The method as claimed in claim 1, wherein the performing longitudinal filtering of the texture frame comprises:
   determining a product of the texture frame downscaled by the predefined factor and a frame comprising bilateral longitudinal coefficients, wherein the bilateral longitudinal coefficients are dissimilar along columns of the frame;
   determining curvelet variances and curvelet medians of elements in each column of the product; and
   performing the longitudinal filtering of each element in each of the columns of the product based on the curvelet variances of the elements in each of the columns of the product and the curvelet medians of the elements in each of the columns of the product.

6. The method as claimed in claim 1, wherein the performing latitudinal filtering of the homogeneous frame comprises:
   determining a product of the homogeneous frame downscaled by the predefined factor and a frame comprising bilateral latitudinal coefficients, wherein the bilateral latitudinal coefficients are dissimilar along rows of the frame;
   determining curvelet variances and curvelet medians of elements in each row of the product; and
   performing the longitudinal filtering of each element in each of the rows of the product based on the curvelet variances of the elements in each of the rows of the product and the curvelet medians of the elements in each of the rows of the product.

7. The method as claimed in claim 1, wherein a partially sharpened curvelet denoised media frame in curvelet space at a current iteration is obtained by convoluting a uniform blur kernel with the curvelet denoised media frame in curvelet space.

8. The method as claimed in claim 1, wherein a partially sharpened curvelet denoised media frame in curvelet space at a current step is obtained by integrating the Fourier trimmed media frame in curvelet space with a result of subtraction of the curvelet denoised media frame in curvelet space from the partially sharpened curvelet denoised media frame in curvelet space obtained at a previous iteration.

9. A method for denoising at least one input media frame captured in a low-light environment, the method comprising:
   filtering frequencies representing noise in an input media frame to obtain a first media frame, wherein the filtering involves trimming Fourier coefficients, obtained by performing a Fourier transform of the input media frame, based on local similarities and global information present in the input media frame;
   extracting a texture frame based on texture details present in the first media frame, and a homogeneous frame based on homogeneous details present in the first media frame, wherein the texture frame and the homogeneous frame are extracted by performing a curvelet transform of the first media frame;
   obtaining a second media frame by integrating an enhanced texture frame and an enhanced homogeneous frame, wherein the enhanced texture frame is obtained by at least one longitudinal filtering of the texture frame and the enhanced homogeneous frame is obtained by at least one latitudinal filtering of the homogeneous frame; and
   obtaining an output media frame by sharpening the second media frame in a plurality of iterations, wherein the sharpening at each iteration is performed based on at least one of a smooth kernel, the second media frame, a partially sharpened second media frame obtained at a previous iteration, and the first media frame.

10. The method as claimed in claim 9, wherein the local similarities are determined by segmenting the input media frame into a plurality of blocks, and computing a bilateral patch variance for each of the plurality of blocks based on standard deviation of pixels in each of the plurality of blocks, and
   wherein the global information is determined by performing the Fourier transform of the input media frame.

11. The method as claimed in claim 9, wherein the texture frame is downscaled prior to the at least one longitudinal filtering, and the enhanced texture frame is upscaled prior to integrating with the enhanced homogeneous frame, and
   wherein the homogeneous frame is downscaled prior to the at least one latitudinal filtering, and the enhanced homogeneous frame is upscaled prior to integrating with the enhanced texture frame.

12. The method as claimed in claim 9, wherein the sharpening at a first iteration is performed by convoluting the smooth kernel with the second media frame, and
   wherein the sharpening at each of the plurality of iterations, apart from the first iteration, is performed by integrating the first media frame with a result of subtraction of the second media frame from the partially sharpened second media frame obtained at the previous iteration.

13. A method for denoising a media frame, the method comprising:
   obtaining a first media frame by filtering Fourier coefficients of the media frame based on at least one of local features information and global features information, extracted from the media frame in a frequency domain;
   obtaining a second media frame by performing longitudinal filtering of texture details extracted from the first media frame in a curvelet domain;
   obtaining a third media frame by performing latitudinal filtering of homogeneous details extracted from the first media frame in the curvelet domain;
   obtaining a fourth media frame by integrating the second media frame and the third media frame; and
   obtaining a denoised media frame by incrementally sharpening the fourth media frame based on a smooth kernel, a partially sharpened fourth media frame, the fourth media frame and the first media frame in the curvelet domain.

14. The method as claimed in claim 13, wherein the texture details extracted from the first media frame are downscaled prior to longitudinal filtering, and
   wherein the second media frame is upscaled prior to integrating with the third media frame.

15. The method as claimed in claim 13, wherein the homogeneous details extracted from the first media frame are downscaled prior to latitudinal filtering, and
wherein the third media frame is upscaled prior to integrating with the second media frame.

\* \* \* \* \*